(12) United States Patent
Nakata et al.

(10) Patent No.: US 7,499,196 B2
(45) Date of Patent: Mar. 3, 2009

(54) PRINT CONTROL PROGRAM, PRINT CONTROL METHOD, AND INFORMATION PROCESSING APPARATUS

(75) Inventors: Hiroaki Nakata, Kawasaki (JP); Masanori Aritomi, Tokyo (JP); Tatsuro Uchida, Yokohama (JP); Yasuhiro Kujirai, Maidenhead (GB)

(73) Assignee: Canon Kabushiki Kaisha, Tokyo (JP)

( * ) Notice: Subject to any disclaimer, the term of this patent is extended or adjusted under 35 U.S.C. 154(b) by 515 days.

(21) Appl. No.: 11/228,275

(22) Filed: Sep. 19, 2005

(65) Prior Publication Data

US 2006/0066907 A1 Mar. 30, 2006

(30) Foreign Application Priority Data

Sep. 24, 2004 (JP) ............................... 2004-278333

(51) Int. Cl.
*H04N 1/40* (2006.01)
(52) U.S. Cl. ........................ 358/2.1; 358/3.1; 358/1.9; 704/2; 704/3; 705/1; 705/2; 705/52
(58) Field of Classification Search .............. 358/2.1, 358/3.1; 704/2–3; 705/1, 2, 52; 715/507
See application file for complete search history.

(56) References Cited

U.S. PATENT DOCUMENTS

| 6,539,114 | B1 * | 3/2003 | Shimazawa ................. 382/195 |
| 7,002,707 | B2 | 2/2006 | Kujirai ....................... 358/1.9 |
| 7,064,849 | B1 | 6/2006 | Nishikawa et al. ......... 358/1.15 |
| 7,210,980 | B2 * | 5/2007 | Swedek et al. ................. 451/6 |
| 7,316,032 | B2 * | 1/2008 | Tayebi et al. .................. 705/51 |
| 2004/0051885 | A1 * | 3/2004 | Matsunoshita .............. 358/1.9 |
| 2005/0088701 | A1 | 4/2005 | Uchida et al. .............. 358/3.28 |
| 2005/0135856 | A1 | 6/2005 | Uchida et al. ............... 399/411 |
| 2005/0168777 | A1 | 8/2005 | Nishikawa et al. ......... 358/1.15 |
| 2005/0219634 | A1 * | 10/2005 | Murakami ................. 358/3.28 |
| 2006/0115140 | A1 * | 6/2006 | Nakamura et al. .......... 382/136 |
| 2006/0119892 | A1 | 6/2006 | Kujirai ...................... 358/1.15 |
| 2006/0140699 | A1 | 6/2006 | Uchida et al. ................ 400/62 |
| 2006/0147236 | A1 | 7/2006 | Uchida et al. ................ 400/62 |

FOREIGN PATENT DOCUMENTS

| JP | 2001-197297 | 7/2001 |
| JP | 2003-5974 | 1/2003 |

* cited by examiner

*Primary Examiner*—Mark K Zimmerman
*Assistant Examiner*—Miya J Cato
(74) *Attorney, Agent, or Firm*—Fitzpatrick, Cella, Harper & Scinto

(57) ABSTRACT

When the trial period for the printer driver of the trial version has elapsed while the license for the printer driver has not been purchased, the normal printing process continues to be enabled, and the density for tint block printing is set to a density at which a latent-image portion appears. Thus, based on the printing results obtained by a printer, the user can observe the same image as the image on which a tint block image is actually printed. As a result, the user understands that unrelated characters "COPY" are superimposed on the original image, and further experiences the effects of the tint block printing function. Further, the user is encouraged to purchase a license for another software product having a tint block printing function.

16 Claims, 17 Drawing Sheets

VISUALIZATION

PRINT CONTROL PROGRAM, PRINT CONTROL METHOD, AND INFORMATION PROCESSING APPARATUS

BACKGROUND OF THE INVENTION

1. Field of the Invention

The present invention relates to a print control program, a print control method and an information processing apparatus. More particularly, the present invention relates to a print control process performed by a system that includes an information processing apparatus, such as a personal computer, and a printing apparatus, such as a printer, for creating and printing images that include tint block images for putting brakes on use of a duplicate.

2. Description of the Related Arts

Conventionally, for inhibiting or restraining copying of forms and certificates of residence, the contents of such documents can be printed on a print medium, on which special print is given, is called forgery inhibiting media. The forgery inhibiting medium is given characters such as "COPY" and the like, which human beings are difficult to visually distinguish when the medium is in an original but are visualized when the medium is subjected to copying by a copy machine. Thus, the forgery inhibiting medium has an effect that makes a person who performs copying have a hesitation in use of duplicates. Also, the forgery inhibiting medium has an effect that restrains or inhibits copying itself because the forms or the like is printed on the forgery inhibiting medium.

However, when compared with common-use print media, the forgery inhibiting media are expensive. Further, since when copying documents, only those characters will appear that were designated at the time of manufacture of the forgery inhibiting media, limitations are imposed on their use, i.e., the use of the forgery inhibiting media is not very flexible.

On the other hand, amid various types of contents are often digitized, also the contents of forms and certificates of residence are digitized. However, the digitization of handling and usage of such digitized forms and certificates of residence are still in a period of transition. In many cases, therefore, contents of digital data generated by use of a computer are outputted on a paper so as to be used.

While taking this situation into account, a technique has been proposed whereby a computer and a printer can be employed to create a forgery inhibiting sheet that conventionally would be prepared in advance using plate making (Japanese Patent Application Laid-open No. 2001-197297). According to this technique, when content data created by a computer are printed, print data is created by superimposing image data called a tint block on the content data, and print out is performed based on the print data. The tint block is also called a forgery pattern. That is, the tint block image (also referred to as "copy-forgery-inhibited pattern image") on an original (i.e., on printed matter output by a printer) appears to human eyes to be only a simple pattern or a mere background color, but is visualized as predetermined characters or a predetermined image when the original is duplicated. Thus, as described above, an original on which the tint block image is printed provides the same inhibiting function as the above described forgery inhibition sheet.

Since tint block images which are superimposed on the content data prepared by a computer, can be output using common-use print media, a cost advantage is realized that is not available when the forgery prevention media prepared in advance are employed. Further, since the tint block image can be created when the content data are printed, not only the color of the tint block image but also characters that become visible when an original is copied can be arbitrarily designated. In addition, information inherent to a printing apparatus, such as the date and time output and the name of the printer, can be used as the tint block image.

As described above, when an original is duplicated, predetermined characters that can not be visually identified before duplication become visible as the tint block image. This visualization of the tint block image can restrain the use of the duplicate, and can allow the duplicate to be easily recognized in a visual way that the printed matter is a copy, i.e., is not an original. In order for this effect to be obtained, basically, the tint block image includes two areas: an area wherein, as a result of duplication, an image is found (appears) on a duplicate; and an area wherein an image disappears or an image density becomes light compared with the image found in the other area. These two areas have almost the same density when these areas are printed, and macroscopically, the printed matter including these two areas can not be visually recognized that characters or the like are hidden that become visible on a duplicate. However, microscopically, e.g., at the printed dot level, the areas have different characteristics, as will be described below.

Hereinafter, for the sake of convenience, an image that appears in a copy is called a "latent-image" and an image that disappears or becomes light in a copy is called a "background image". A tint block image basically consists of the latent-image and the background image. It should be noted that as a user interface term a latent-image may be called a foreground.

The form of a tint block image is not limited to the one described above, and may take any form, such as a character string "COPY", a logo or a pattern, that appears (becomes visible) in a duplicate so as to be identified by a human being. That is, also in the case that a character string "COPY" of an outline state appears in a duplicate, its purpose as a tint block image can be achieved. In this case, the character string "COPY" is prepared as a background image.

For a dot printer, such as an electro-photographic printer or an ink jet printer, an area wherein an image is fond in a duplicate copy (in a latent-image portion or a foreground portion) is formed with a concentrated set of dots. An area (a background portion) wherein the image in the duplicate copy disappears, or the image is reproduced at a density lower than that in the other area wherein the image appears, is formed using a dispersed set of dots. Then, when the tint block image is printed, the densities in these areas are adjusted so they are almost equal and the overall density of the tint block image is substantially uniform.

FIG. 15 is a diagram showing the two areas. As shown in FIG. 15, the tint block image is formed of the background portion, wherein dots are putted dispersedly, and the latent-image portion, wherein concentrated dots are putted. These two areas can respectively be generated by employing different halftone dot processes or different dithering processes. In case of creating the tint block image by performing the halftone dot process, the halftone dot process for a small line number is appropriate for the latent-image portion, while the halftone dot process for a large line number is appropriate for the background portion. In the case of creating the tint block image by performing a dither process, the dithering process employing a dot concentration dither matrix is appropriate for the latent-image portion, while the dithering process employing a dot dispersion dither matrix is appropriate for the background portion.

For a copying machine that copies a tint block image that is printed in the above described manner, there is a limiting point to a reproduction capability that depends either on an input resolution that can read a minute dot of a document image, or on an output resolution that can reproduce a minute dot. Therefore, a dot of the background portion of the tint block image can be formed smaller than the limiting point of the dot that the copier can reproduce, and a dot of the latent-image portion can be formed larger than the limiting point. As a result, the portion of the tint block image formed using a group of large dots is reproduced in a duplicate, and the portion formed using a group of small dots is not reproduced (is not found) in the duplicate. Thus, the latent-image can be visualized and the background can be disappeared. Further, even if in a duplicate dispersed minute dots do not completely disappear, so long as their density is low, compared with the density of the groups of concentrated dots, the visibility of the latent-image will be enhanced.

FIGS. 16A and 16B are diagrams showing the visualization of a latent-image. In FIG. 16A, the state wherein a tint block image has been printed is shown, and in FIG. 16B, a duplicate obtained when the original image, shown in FIG. 16A, is copied by a copying machine is shown. By referring to FIGS. 16A and 16B, it can be understood that the latent-image, formed of groups of concentrated dots, appears, and that the background, formed of dispersed dots, disappears.

In a system wherein a printing apparatus, such as a printer, is connected to an information processing apparatus, such as a personal computer, to perform printing, generally, the personal computer employs a program that includes a function for the issue of printing instructions to the printer. The computer also employs a program (a printer driver) that, for printing, serves as an intermediator between an application and a specific printer and that provides more specified printing control. For the system configuration, it is preferable that the above described operation of the computer, for creating a tint block image, be performed by a printer driver, and recently, many printer drivers have become available that include a tint block image printing function.

Whereas printer drivers on CD-ROM media are ordinarily provided users as printer accessories or are distributed at no cost via the Internet, printer drivers having incorporated tint block printing functions, as value-added add-ins, or library modules that provide tint block printing functions, and are separately installed, are often sold separately as fare-paying software products.

Fare-paying software products, including the printing-relevant products described above, tend to be shunned by users, and accordingly, the sale of such products is languishing. It has therefore been proposed that, for promoting the sales, parties who produce and sell software products provide the software to users without cost for limited trial periods, to permit the users to employ and evaluate software before purchasing it. For example, when a user has employed a software product for a limited trial period and decides, as a result, to purchase it, the user need only purchase a license to continue to use the software following the expiration of the trial period. On the other hand, if a license is not purchased after the expiration of the trial period, continuing use of the software can be inhibited by an incorporated timing process (Japanese Patent Application Laid-open No. 2003-5974).

However, for an example of a printer driver which includes a tint block printing function, when the purchase of a license does not occur before the expiration of a trial period, the execution of the above described process that merely inhibits the use of the software may be improper.

For example, when printing using such a printer driver is disabled once a trial period has expired, it constitutes a great inconvenience for a user who desires only to perform normal printing. That is, of the users who employ of these printer drivers for printing, there will be some who are not particularly aware they have a tint block printing function or know little about it. For these users, it may be incomprehensible that all printing is disabled once the trial period has elapsed. Especially, while taking into account the fact that generally a common printer driver not having a value-added function, such as the tint block printing function is provided at no cost, users may not fully understand why printing has been disabled. Furthermore, when all printing is inhibited upon the expiration of the trial period, the printing operation is not properly done, e.g., scheduled printing can not be performed.

To resolve these shortcomings, it is possible inhibit only the use of the tint block printing function when a trial period has elapsed. This is preferable, because it is not caused that a user will have incomprehensible feel and the printing operation will not be properly done. Further, in the case that after the trial period has expired a user who continually employs the software desires to use the tint block printing function, it is preferable for the user and the maker that, even though the tint block printing is not normally executed, the user can experience some of the effects associated with the tint block printing function. This is because such a user experience can promote the sale of a software product that includes a tint block printing function.

SUMMARY OF THE INVENTION

An object of the present invention is to provide a print control program, a print control method and an information processing apparatus that can continuously perform normal printing, and that can promote the sale of software products having a tint block printing function.

According to the above described arrangement, normal printing can be continuously executed, and the sale of software products having a tint block printing function can be promoted.

The above and other objects, effects, features and advantages of the present invention will become more apparent from the following description of embodiments thereof taken in conjunction with the accompanying drawings.

DETAILED DESCRIPTION OF THE PREFERRED EMBODIMENT

The preferred embodiment of the present invention will now be described in detail while referring to the accompanying drawings.

In the following embodiment, when printed matter bearing a tint block image is copied, an area wherein the tint block image is visualized on a duplicate is called a latent-image or a foreground portion, and an area wherein an image disappears on a duplicate, or the density becomes less than that in the latent-image portion, is called a background portion. In the following explanation, it is assumed that text information or image information is inputted as the latent-image portion, and these text information and image information will be visually identified at a density higher than that in the background portion on a duplicate.

The tint block image for the invention is not limited to these entries. For example, text information or image information may be set as the background portion, and the area around the background portion may be designated as the latent-image portion, so that the text information or the image information may appear in outlined image on the duplicate. Further, the present invention is not limited by the type of tint block image and the generation process, and the color, the shape and the size of the tint block image.

While referring to FIGS. 1 to 11, an explanation will be given for the printing processing, and the associated configuration, for a system that comprises a computer, which is an information processing apparatus, and a printer, which is a printing apparatus, according to one embodiment of the present invention, that generates basic drawing data for a tint block image (tint block print data: also referred to as "a copy-forgery-inhibited pattern print data"). It should be noted that a system that includes a computer and a printer is employed to explain the processing related to a tint block image; however, the present invention is not limited to this configuration.

Configuration of a Printing System

Figure 1:
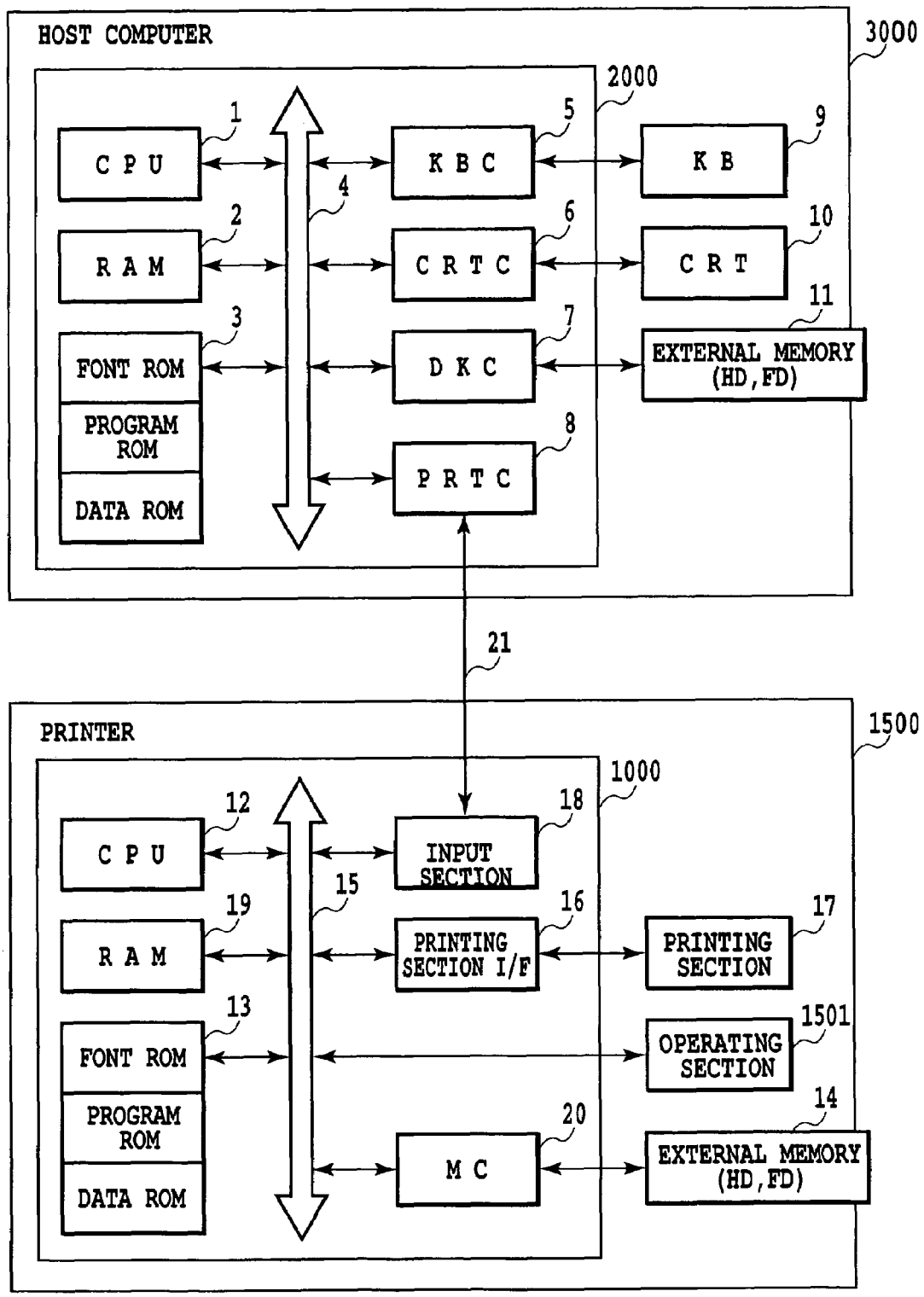
FIG. 1 is a block diagram showing the configuration of a printing system according to one embodiment of the present invention.

FIG. 1 is a block diagram showing the configuration of a printing system according to the embodiment of the present invention. So long as the function of the present invention is performed, the present invention can be applied for a single apparatus, a system that includes a plurality of apparatuses, or a system for which apparatuses are connected via a network, such as a LAN or a WAN, to perform the required processing.

In FIG. 1, a host computer 3000 includes a CPU 1 that, based on a document program stored in the program ROM of a ROM 3, or in an external memory 11, performs a process for a document wherein graphics, images, characters and tables (including spreadsheets) coexist, and performs a printing process based on the document process. The CPU 1 provides overall control for the individual devices connected to a system bus 4. An operating system program (hereinafter referred to as an OS), which is a control program for the CPU 1, for example, is stored in the program ROM in the ROM 3, or in the external memory 11. Font data and various other data to be used for the document process are stored either in the font ROM of the ROM 3 or in the external memory 11. A RAM 2 is employed as the main memory or a work area for the CPU 1.

A keyboard controller (KBC) 5 controls either key entry at a keyboard 9 or a pointing device (not shown). A CRT controller (CRTC) 6 controls a display on a CRT display (CRT) 10, including the display of a tint block image. A disk controller (DKC) 7 controls access to a hard disk (HD) on which, for example, a boot program, various applications, font data, a user file, an edit file and a printer control command generation program (hereinafter referred to as a printer driver) are stored, and access to an external memory 11, such as a floppy (trademark) disk (FD). A printer controller (PRTC) 8 is connected to and communicates with a printer 1500 via a bi-directional interface (hereinafter referred to simply as an interface) 21.

In accordance with a command designated by using a mouse cursor (not shown) on the CRT 10, the CPU 1 opens various windows that have previously been registered and performs various data processing functions. A user, when beginning a printing process, opens a printing setup related window and designates a printer and a printing method, including a selected printing mode, for a printer driver.

The printer 1500 is controlled by a CPU 12 located therein. Based on a control program stored in a ROM 13, or a control program stored in an external memory 14, the CPU 12 outputs an image signal, as print output information, to a printing section (a printer engine) 17 connected to a system bus 15.

A control program for the CPU 12 is stored in the program ROM of the ROM 13, and font data to be used for the generation of the print output information are stored in the font ROM of the ROM 13. In the data ROM of the ROM 13, information to be used by a computer is stored when a printer that does not have an external memory 14, such as a hard disk, is employed.

The CPU 12 can communicate with the host computer 3000 via an input section 18, and can transmit to the host computer 3000 information concerning the printer 1500. A RAM 19 is used as either the main memory or a work memory for the CPU 12. The capacity of the RAM 19 can be extended by connecting an optional RAM to an expansion port (not shown). It should be noted that the RAM 19 is employed, for example, as an output information development area, an environment data storage area or an NVRAM.

Access to the hard disk (HD) and the external memory 14, such as an IC card, is controlled by a memory controller (MC) 20. The external memory 14 is connected as an option, and font data, or an emulation program and font data, can be stored in the external memory 14. The input section 18 is, for example, an LED indicator and a switch, which can be manipulated, on an operating section 1501.

The printer 1500 also has an NVRAM (not shown) in which printer mode setup information, entered at the operating section 1501, may be stored.

The printing section 17 is an electro-photographic engine in this embodiment. Therefore, print data, including a tint block image, can be printed by producing toner dots on a medium such as paper. The printing method used for this invention is naturally not limited to the electro-photographic method, and the present invention can also be applied for a printing apparatus, such as an ink jet printing apparatus, that prints an image by depositing ink dots.

Figure 2:
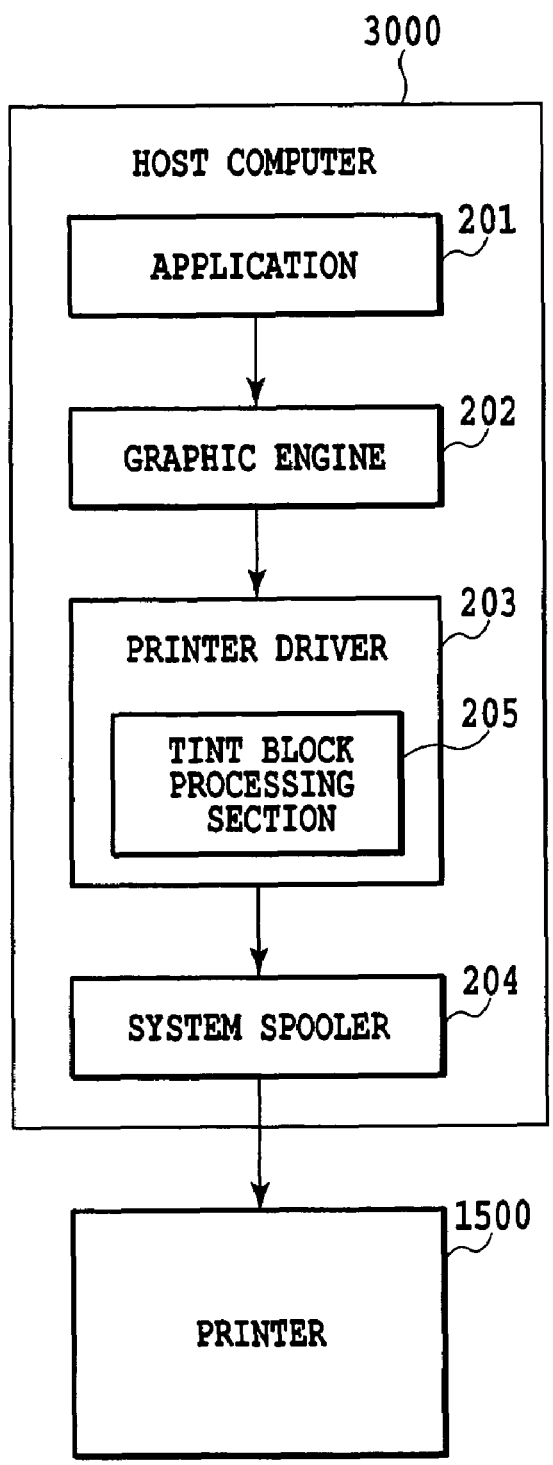
FIG. 2 is a diagram showing an arrangement for a computer 3000 in FIG. 3 that performs the printing processing.

FIG. 2 is a diagram showing one example of arrangement for the printing processing performed by the computer 3000 in FIG. 1. An application 201, a graphic engine 202, a printer driver 203 and a system spooler 204 are present as files stored in the external memory 11. These files are program modules that are loaded into the RAM 2 and are executed by the OS or by a module that employs these program modules.

The application 201 and the printer driver 203 can be recorded on an FD or a CD-ROM (not shown) that serves as the external memory 11, or can be recorded, via a network (not shown), on an HD that serves as the external memory 11. The application 201 stored in the external memory 11 is loaded into the RAM 2, and is executed. When the printer 1500 is to perform printing based on the application 201, the graphic engine 202, which is also loaded into the RAM 2 and is ready to be executed, is used for the printing (drawing).

The graphic engine 202 loads in the RAM 2 the printer driver 203, in the external memory 11, that is prepared for each printing apparatus, such as a printer, and designates, for the printer driver 203, the output of the application 201. Further, the graphic engine 202 transforms a GDI (Graphic Device Interface) function, received from the application 201, into a DDI (Device Driver Interface) function, and outputs the DDI function to the printer driver 203. The printer driver 203 then employs the DDI function received from the graphic engine 202 to obtain a control command that a printer can identify, for example, a PDL (Page Description Language) command. The thus obtained printer control command is the output as print data to the printer 1500 via a system spooler 204, which has been loaded into the RAM by the OS, and the interface 21.

According to the printing system in this embodiment, the printer driver 203 includes a tint block processor 205. The tint block processor 205 may be a built-in module for the printer driver 203, or may be a library module added by performing a separate installation. For the printing of a tint block image, the tint block processor 205 of the printer driver 203 performs a tint block image drawing process that will be described later. Furthermore, as will be described while referring to FIGS. 12 and 13, the printer driver 203 in this embodiment may be either a printer driver having a tint block printing function, which was installed as a free trial version, or a printer driver that can continue to be employed after the trial period has elapsed.

Explanation of Tint Block Image Printing Processing

Figure 3:
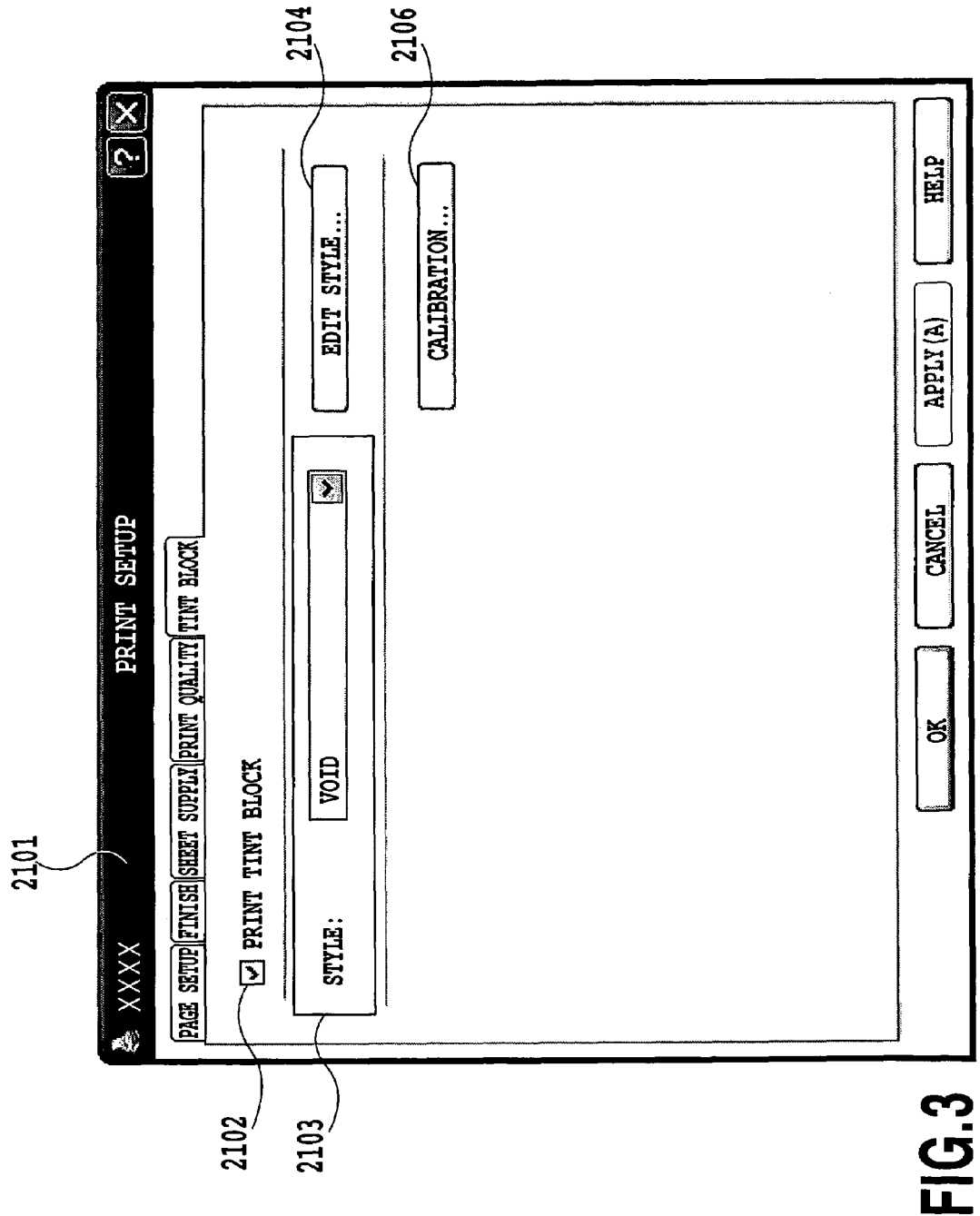
FIG. 3 is a diagram showing the initial screen of a user interface related to tint block printing according to the embodiment.

FIGS. 3 and 4 are diagrams showing a user interface for a setup related to tint block image printing according to this embodiment.

FIG. 3 is a diagram showing the initial screen for a user interface related to tint block printing performed by the printer driver 203. In this example, a setup related to tint block printing can be performed on a property sheet 2101 in a dialogue.

Reference numeral 2102 denotes a check box that is used to select tint block printing (printing that includes a tint block image; this is hereinafter applied in the same manner) for a print job. The contents entered in the check box 2102 are stored as additional print information and include print setup information related to print data (original data). Reference numeral 2103 denotes style information that is used to set information for multiple tint block printing setups.

Figure 4A:
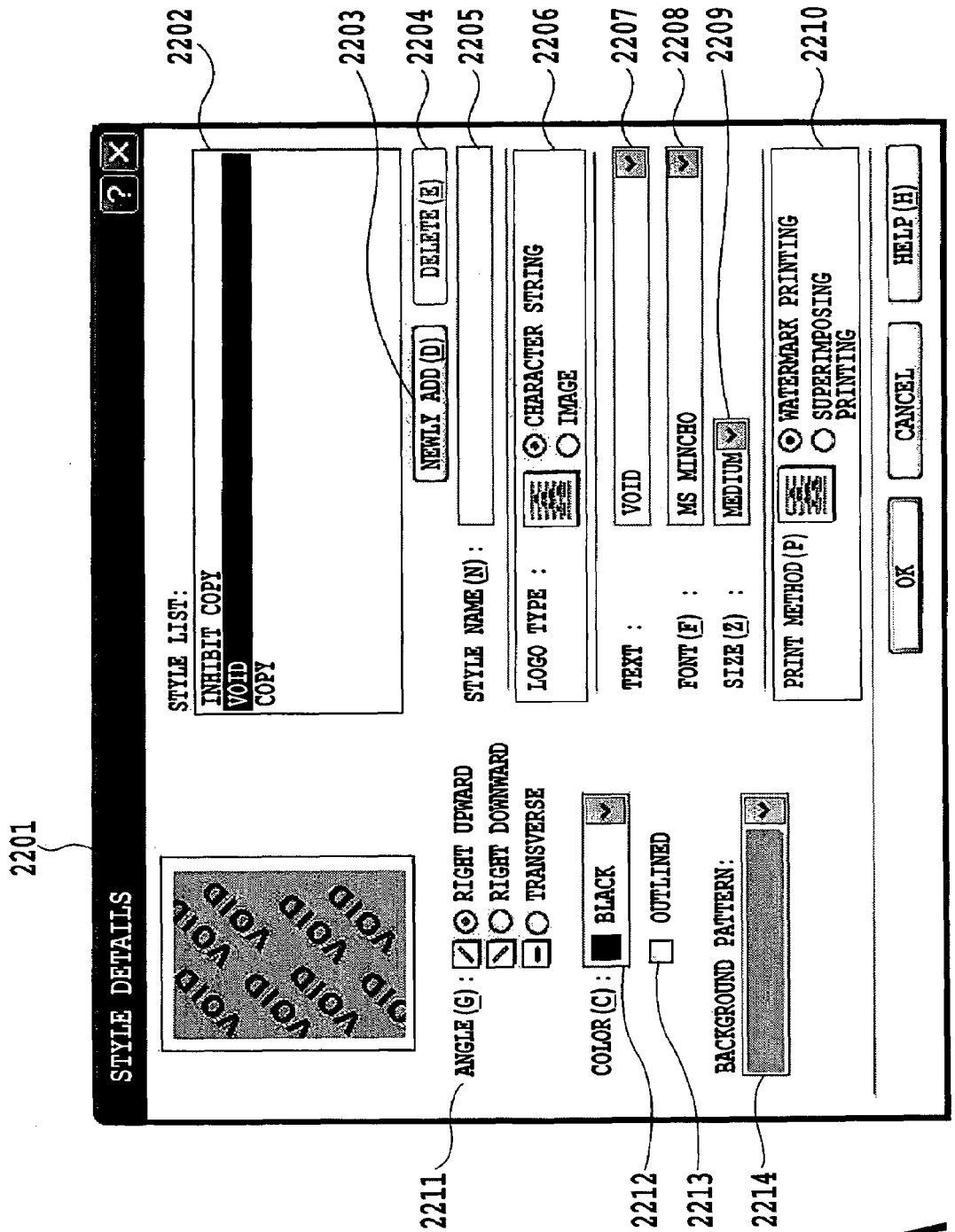
FIGS. 4A and 4B are diagrams showing a dialogue used to edit detailed individual setups for tint block printing according to the embodiment.

FIG. 4A is a diagram showing a dialogue used to edit the individual detailed setups for tint block printing.

In FIG. 4A, a tint block image, which is generated based on individual sets of tint block data, is displayed as a preview in a tint block information editing dialogue 2201. An area 2201 is used to display a list of the styles selectable in the style information 2103. A style can be newly added or deleted by using a button 2203 or 2204. An area 2205 is used to display the name of the currently selected style.

Figure 4B:
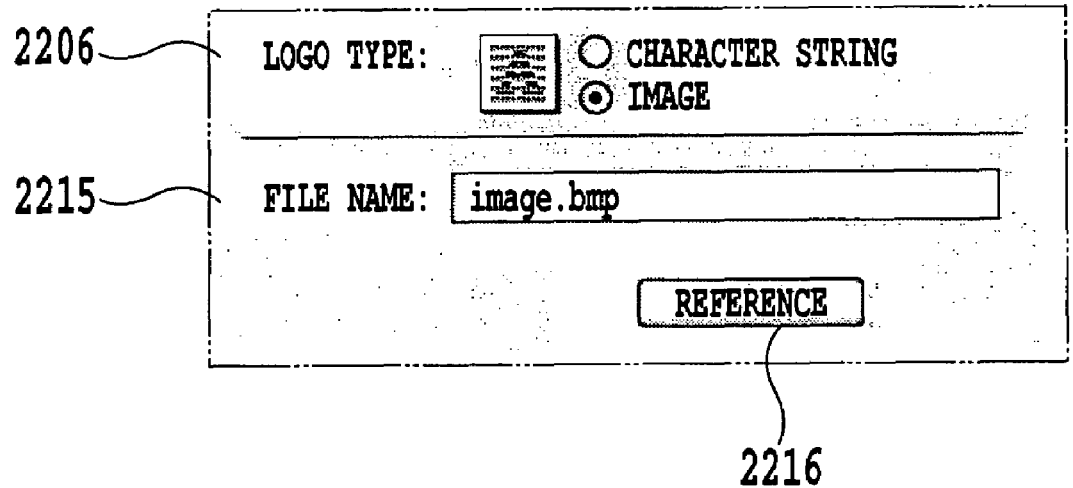

A radio button area 2206 is used to select the type of drawing object to be used for tint block printing. When a user selects "character string" in the radio button area 2206, a text object is usable, and when the user selects "image", image data, such as BMP, is usable. In FIG. 4A, "character string" is selected, and setup information, in the areas 2207 to 2209, related to a text object is displayed in the dialogue 2201 and the editing process is enabled. When "image" is selected in the radio button area 2206, no setup information is displayed in the areas 2207 to 2209, instead, as shown in FIG. 4B, an image file name column 2215 and a button 2216, indicating a file selection dialogue (not shown), are displayed.

In this embodiment, the types of drawing objects used for tint block printing are a "character string" and an "image", and one of these types is selected. However, the drawing object types are not limited to these two, and multiple drawing object types may be selected at the same time.

The area 2207 is used to display and edit a character string to be used as a tint block image. The area 2208 is an area used to display and edit font information for a character string. In this embodiment, only a font name is selected; however, this area 2208 may be extended for the selection of font family information (e.g., bold or italic) and associated character information.

The area 2209 is used to display and designate the font size of a character string that is employed as a tint block pattern. In this embodiment, three levels, "large", "medium" and "small", can be selected; however, a common font size selection method, such as a method for directly entering the number of points, may be employed.

A radio button area 2210 is used to designate the order in which a tint block pattern and original data are to be printed. When "watermark printing" is selected in the radio button area 2210, a tint block pattern is drawn first and then original data are drawn. When "superimposed printing" is selected, original data are drawn first and then a tint block pattern is drawn. The drawing process will be described later.

A radio button 2211 is used to select the arrangement angle for a tint block pattern. In this embodiment, three angles, "upper right", "lower right" and "horizontal", can be selected. However, the angle designation method may be expanded by a numerical value entry area arrangement wherein an arbitrary angle can be selected, or by using a slider bar for which an arrangement can be intuitively designated.

An area 2212 is used to display and select a color for a tint block pattern (a foreground pattern or a background pattern). A check box 2213 is used to switch the foreground and background patterns. When the check box 2213 is not selected, a tint block image is created wherein the foreground pattern appears on a duplicate. That is, it is designated that the foreground pattern will be reproduced on the duplicate. On the other hand, when the check box 2213 is selected, a tint block image is created wherein the background pattern appears on the duplicate. That is, it is designated that the background pattern will be reproduced on the duplicate. At this time, text information and image information designated for the foreground information can be recognized in an outline state.

An area 2214 is used to designate a camouflaged image that is difficult for human eyes to identify, a tint block image that is included in printed matter. A camouflaged image can be selected from among a plurality of patterns, and an opportunity is also provided to choose not to a camouflaged image.

Explanation of a Density Adjustment Process

Figure 5:
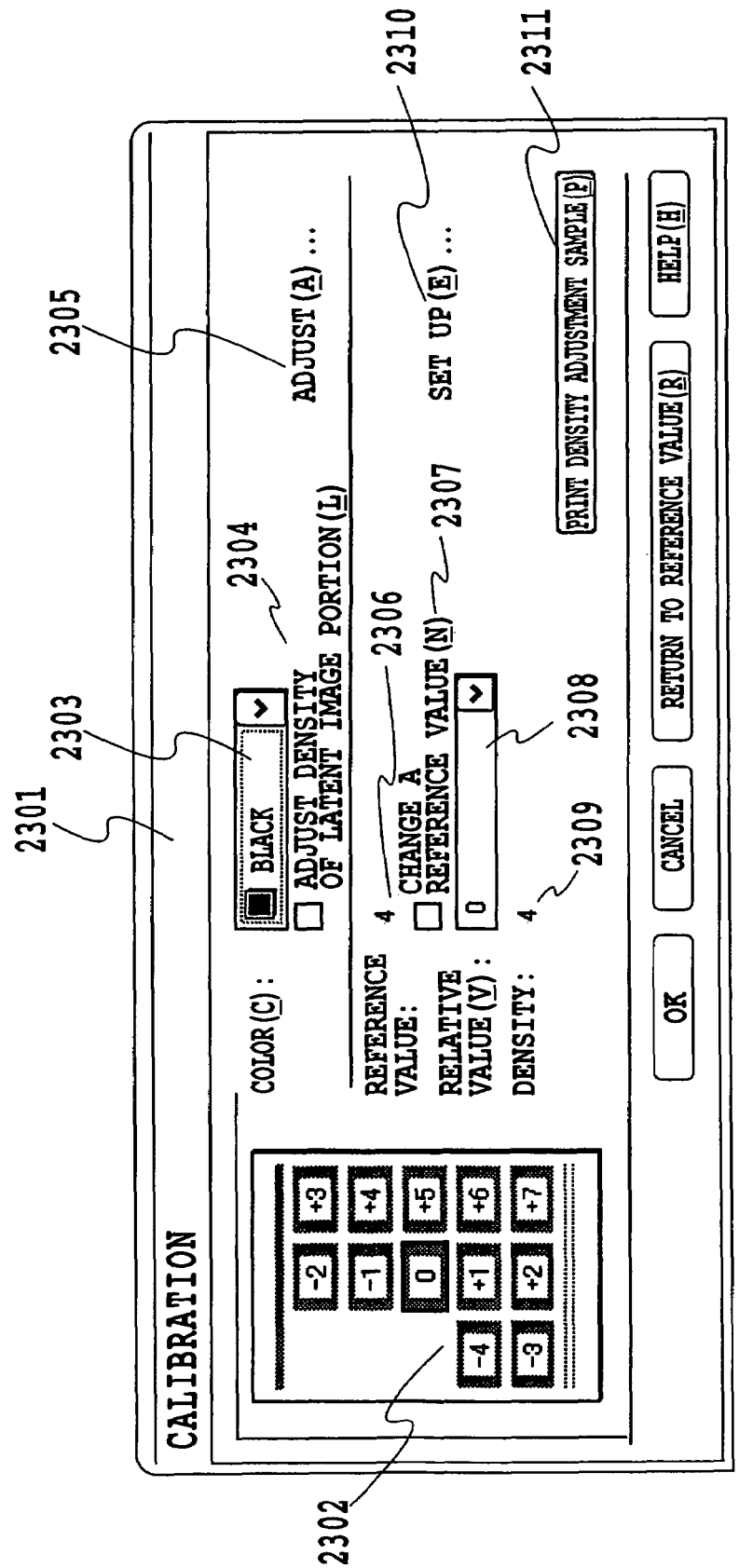
FIG. 5 is a diagram showing a user interface related to calibrations performed according to the embodiment.

When a button 2106 in the property sheet 2101 is depressed, a "calibration" dialogue 2301 in FIG. 5 is displayed.

FIG. 5 is a diagram showing the calibration dialogue 2301 for the density adjustment process performed for a tint block image. In this embodiment, the densities of the latent-image portion and the background portion of the tint block can be adjusted for "black", "light blue" or "reddish purple". First, in a composition box 2303, the color for calibration is selected from among "black", "light blue" and "reddish purple". When the printer to be used is a monochrome printer, the composition box is grayed out.

Figure 6:
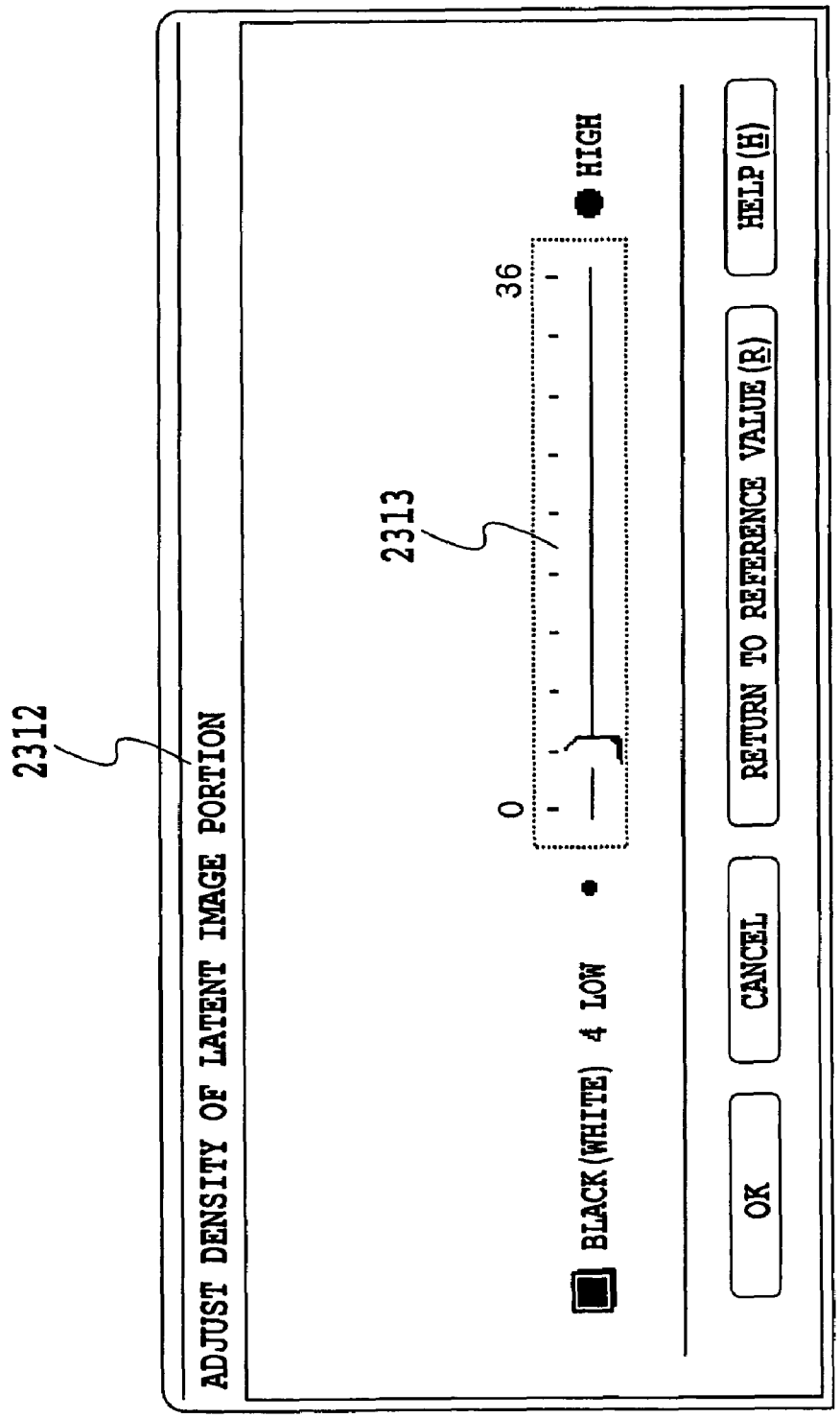
FIG. 6 is a diagram showing a user interface related to density adjustments, for a latent-image portion, that are included in the calibrations performed according to the embodiment.

When a check box 2304 indicating "adjust the density for a latent-image portion" is selected, an "adjustment" button 2305 is validated, and when this button 2305 is selected, a "latent-image portion density adjustment" dialogue 2312 in FIG. 6 is displayed. By moving a slide bar 2313 in the dialogue 2312, the density of the latent-image portion can be adjusted from 0 to 36.

Figure 7:
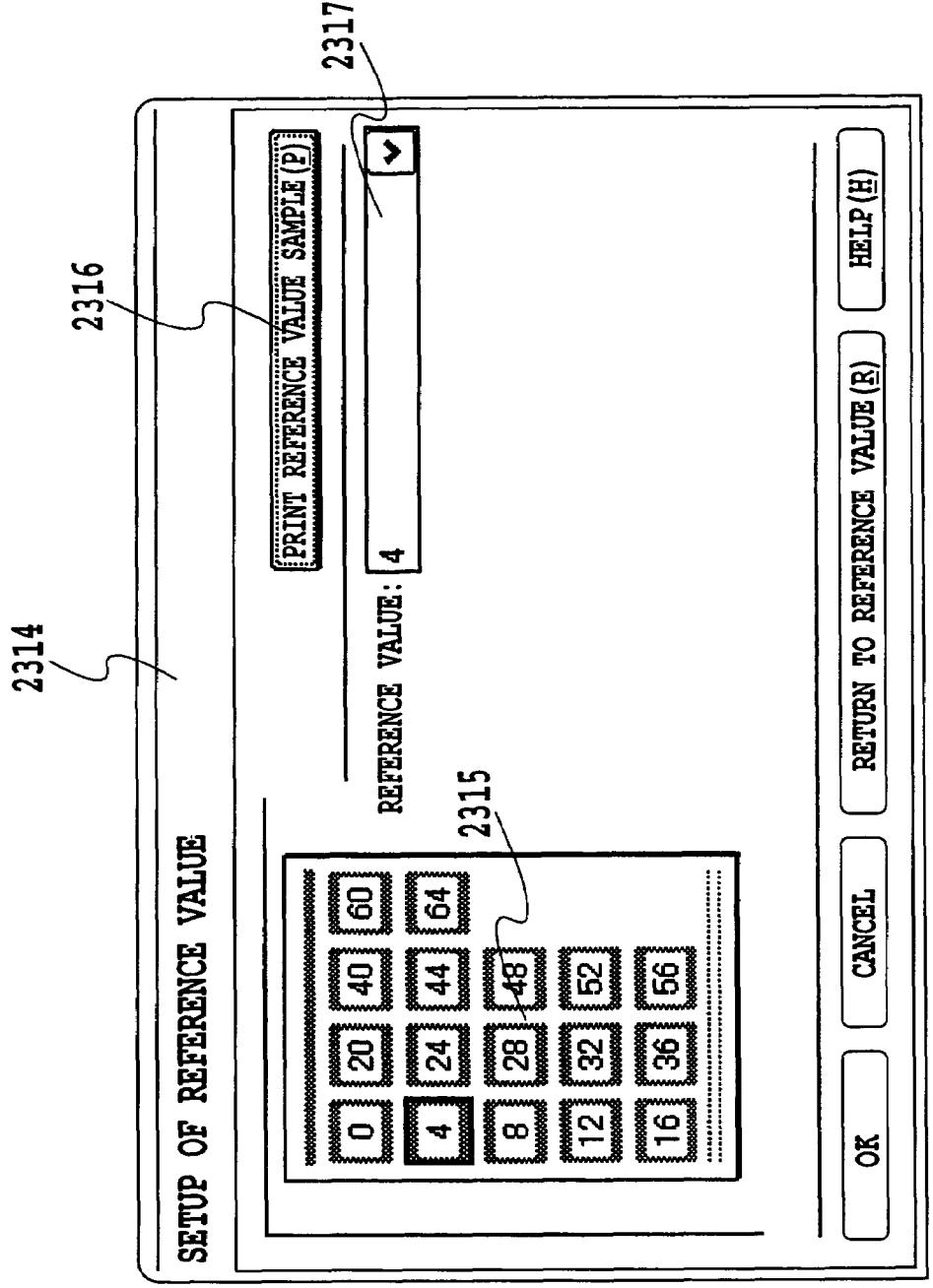
FIG. 7 is a diagram showing a user interface related to the calibrations performed according to the embodiment.

The density of the background portion of the tint block image can be changed from 0 to 64. Since a delicate adjustment is required, in this embodiment, two values, i.e., a "reference value" and a "relative value", are employed to adjust the density of the background portion. A static text 2306 represents a reference value, such as "4", that is currently designated. When a check box 2307 "change a reference value" is selected, a "setup" button 2310 is validated, and when this button 2310 is selected, a "reference value setup" dialogue 2314 in FIG. 7 is displayed.

In the "reference value setup" dialogue 2314, a desired value can be designated using a "reference value" composition box 2317 in which reference values 0 to 64 are enumerated at intervals of 4. When a more delicate adjustment is required for the thus designated reference value, a user can return to the "calibration" dialogue 2301 (FIG. 5) and select a value, relative to the reference value, of from −7 to +7 in a "relative value" composition box 2308. In a preview area 2302 on the left, relative values of −7 to +7 are allocated as thumbnails, and when a relative value is selected in the "relative value" composition box 2308, a corresponding thumbnail is interactively displayed with a black frame. The density that is determined in this manner, i.e., the sum of the reference value and the relative value, is displayed in a "density" static text area 2309.

In FIG. 5, when a "density adjustment sample print" button 2311 is selected, the list of thumbnails displayed on the preview 2302 is printed. While examining the sample printed matter, the user specifies the density at which a latent-image portion is the most difficult to recognize, and can further adjust the density in accordance with this result. When a "print reference value sample" button 2316 is selected in the "reference value setup" dialogue 2314, an image same as an object symbolically displayed in a preview area 2315 for the reference values is actually printed by the printer, and the printing densities of the individual reference values can be examined.

Data Form of Tint Block Printing Setup Information

Additional print information, which is tint block printing setup information in FIG. 4, will now be described while referring to FIG. 8. In this embodiment, the additional print information that will be explained below is stored in a job output file that is stored as information consisting of a physical page to be printed. For the storage of the additional print information, not only the job output file, but also various other forms can be employed.

Figure 8:
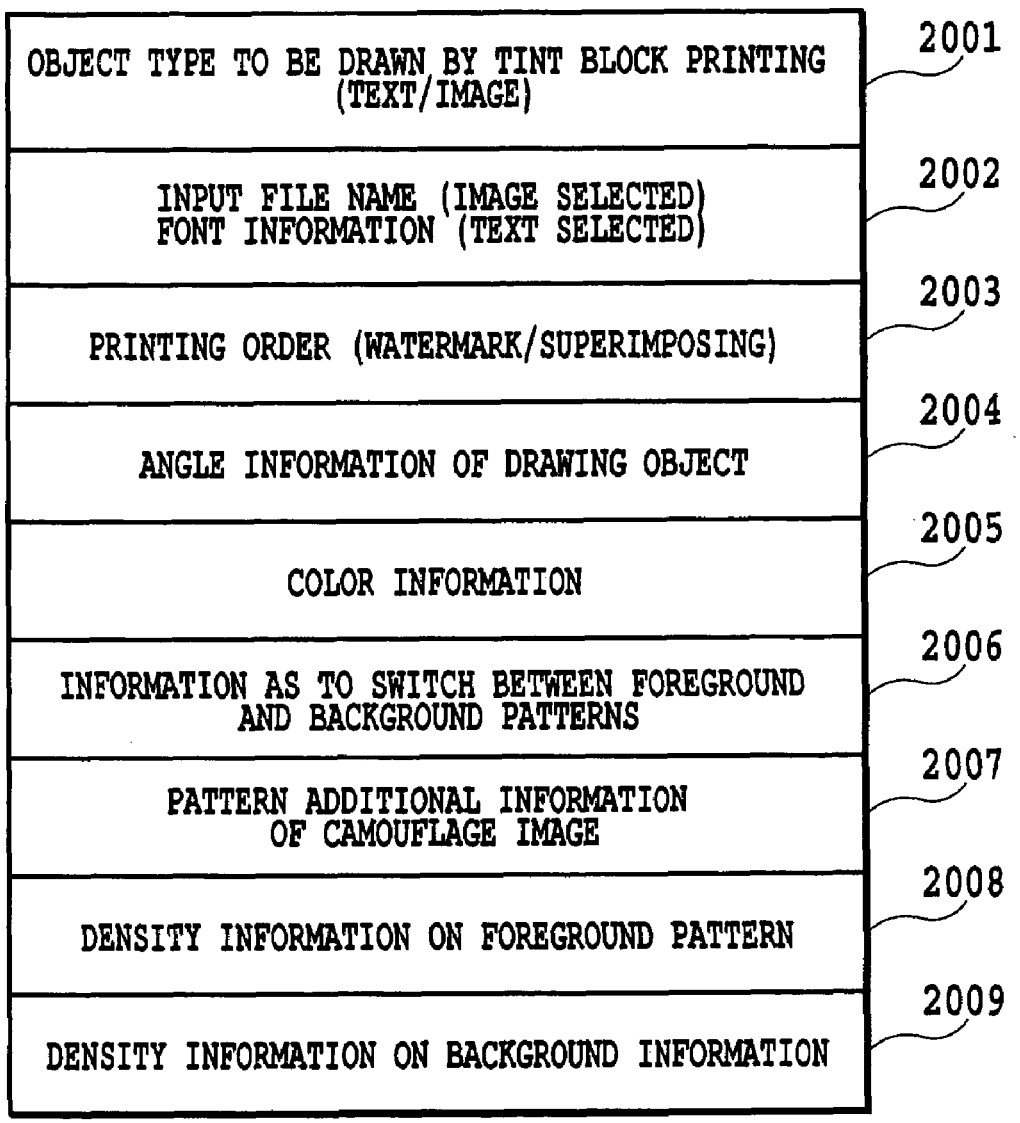
FIG. 8 is a conceptual diagram showing the structure of additional printing information related to setup information for tint block printing according to the embodiment.

In FIG. 8, a value that is inputted in the radio button area 2206 in FIG. 4A and that indicates an object type (a text form or an image) to be drawn using tint block printing is stored in a field 2001. Setup information, for the drawing object designated in the field 2001, that is entered in the area 2207 to 2209 in FIG. 4A or in FIG. 4B is stored in a field 2002. When "text" is selected as a drawing object, a character string, a font name and size information are held in the field 2002. When "image" is selected as a drawing object, the location of an image file to be entered is stored.

Information that is entered in the radio button area 2210 in FIG. 4A and that indicates the drawing order according to which a tint block pattern is drawn first or according to which original data are drawn first is stored in a field 2003.

Angle information that is entered in the area 2211 in FIG. 4A and that is used to arrange a drawing object is stored in a field 2004. Color information that is entered in the area 2212 in FIG. 4A and that is used to a tint block pattern (foreground pattern or a background pattern) is stored in a field 2005.

Information concerning the foreground pattern and the background pattern that are entered in the check box 2213 in FIG. 4A is stored in a field 2006. Pattern additional information for a camouflage image that is entered in the area 2214 in FIG. 4A is stored in a field 2007. Density information for the foreground pattern is stored in a field 2008, and density information for the background pattern is stored in a field 2009.

Tint Block Pattern Drawing Processing

Figure 9:
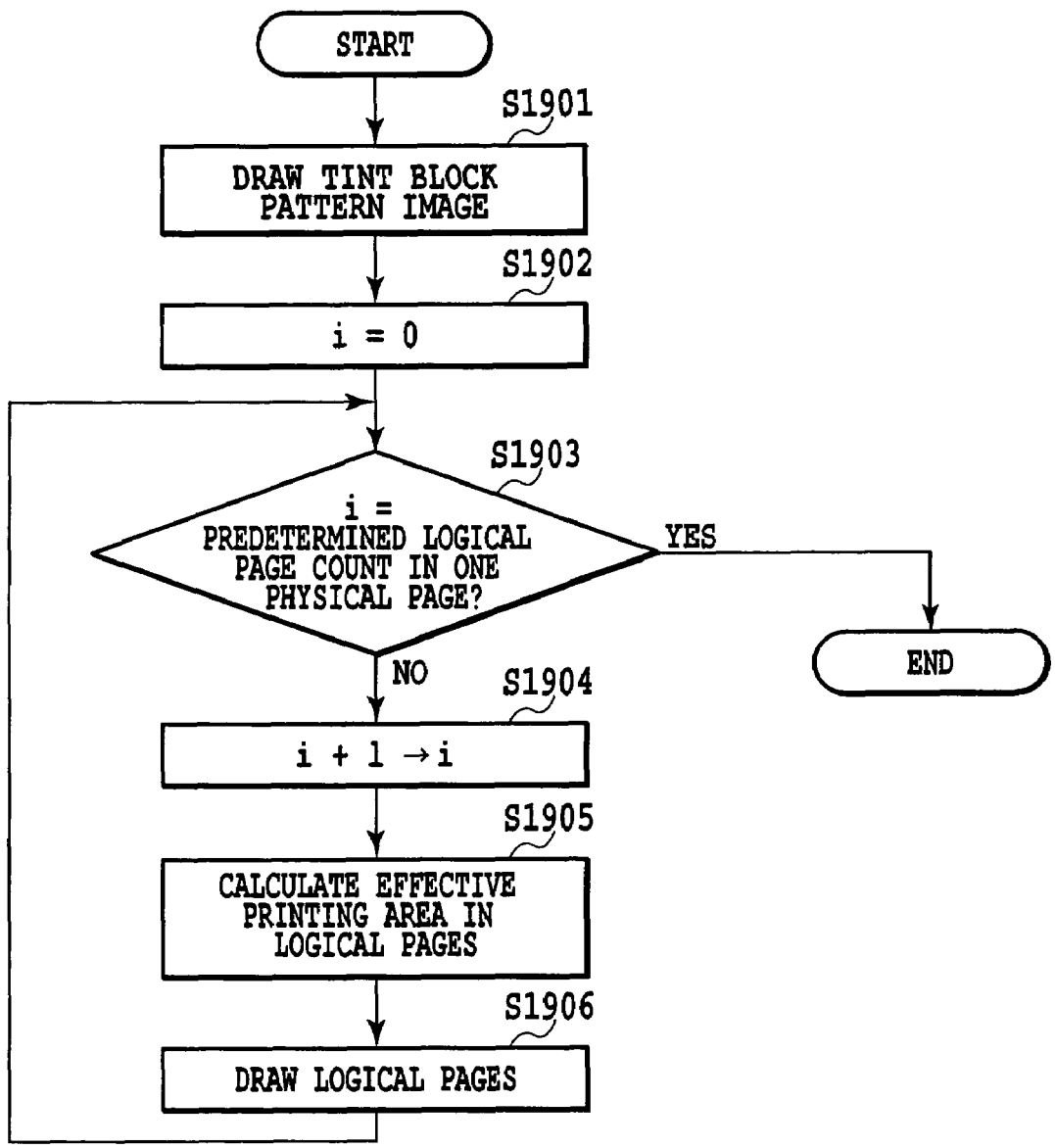
FIG. 9 is a flowchart showing the drawing processing performed for watermark tint block printing according to the embodiment.
Figure 10:
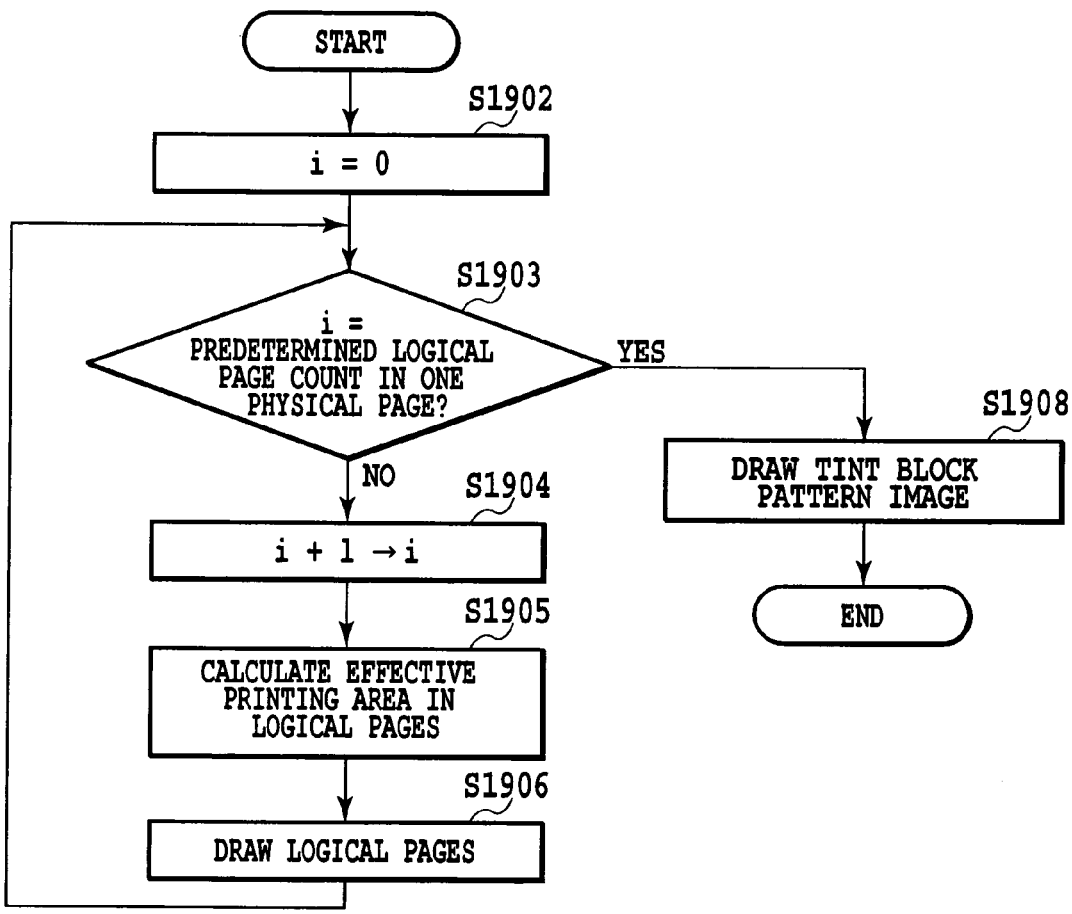
FIG. 10 is a flowchart showing the drawing processing performed for the superimposed tint block printing according to the embodiment.

FIGS. 9 and 10 are flowcharts showing the drawing processing performed for tint block printing. In the flowcharts, drawing processing corresponding to "watermark printing" and "superimposed printing", while referring to FIG. 4A, is shown. The drawing processing is performed by the CPU 1, which controls the printing process by using the printer driver 203. In FIGS. 9 and 10, the same step numbers are employed to perform the same processes.

First, "watermark processing", i.e., the processing for drawing a tint block pattern before original data will be described while referring to the flowchart in FIG. 9.

At step S1901, the CPU 1 draws a tint block pattern in accordance with the tint block pattern information shown in FIG. 8. The detailed processing will be described later while referring to FIG. 11. Then, program control shifts to the original data drawing processing. At step S1902, the CPU 1 initializes a counter that counts the number of logical pages for one physical page (one face of a print sheet).

Then, at step S1903, the CPU 1 determines whether the value held by the counter has reached a pre-designated number of logical pages for one physical page. When it is determined that the value is equal to the pre-designated number of logical pages, program control jumps to step S1908. When the value is not equal to the pre-designated number of logical pages, program control advances to step S1904.

At step S1904, the CPU 1 increments the counter value by one, and at step S1905, employs the number of logical pages for one page and the counter value to calculate the effective printing area for logical pages to be drawn. Following this, at step S1906, based on printing setup information (not shown) for a physical page, the CPU 1 reads a current logical page number while using the counter value as an index. Thereafter, the CPU 1 contracts the logical pages and reduces their size so that they can fit in the effective printing area. Of course, contraction is not required when multiple logical page printing is not designated.

The drawing processing related to "watermark printing" has been described.

Next, the "superimposed printing", i.e., the processing for drawing original data first, and then a tint block pattern will be described while referring to the flowchart in FIG. 10.

At step S1902, the CPU 10 initializes the counter that counts the number of logical pages for one physical page (one face of a print sheet).

Next, at step S1903, the CPU 1 determines whether the counter value has reached a pre-designated number of logical pages for one physical page. When the counter value is equal to the number of logical pages, program control jumps to step S1908. When the counter value is not equal to the number of logical pages, program control advances to step S1904.

At step S1904, the CPU 1 incremented the counter value by one, and at step S1905, employs the number of logical pages for one page and the counter value to calculate the effective printing area for the logical pages to be drawn. Then, at step S1906, based on the printing setup information (not shown) related to a physical page, the CPU 1 reads the current logical page number while using the counter value as an index. Thereafter, the CPU 1 contracts the logical pages so that they will fit in the effective printing area. Of course, contraction is not required when multiple logical page printing is not designated.

When a predetermined number of logical pages have been developed as one physical page, program control advances to step S1908. At step S1908, in accordance with the tint block pattern information in FIG. 8, the CPU 1 draws a tint block pattern in the effective printing area of the physical page obtained from the application. The detailed processing to be performed will be described later, while referring to FIG. 11, as will the processing to be performed for the watermark printing.

Figure 11:
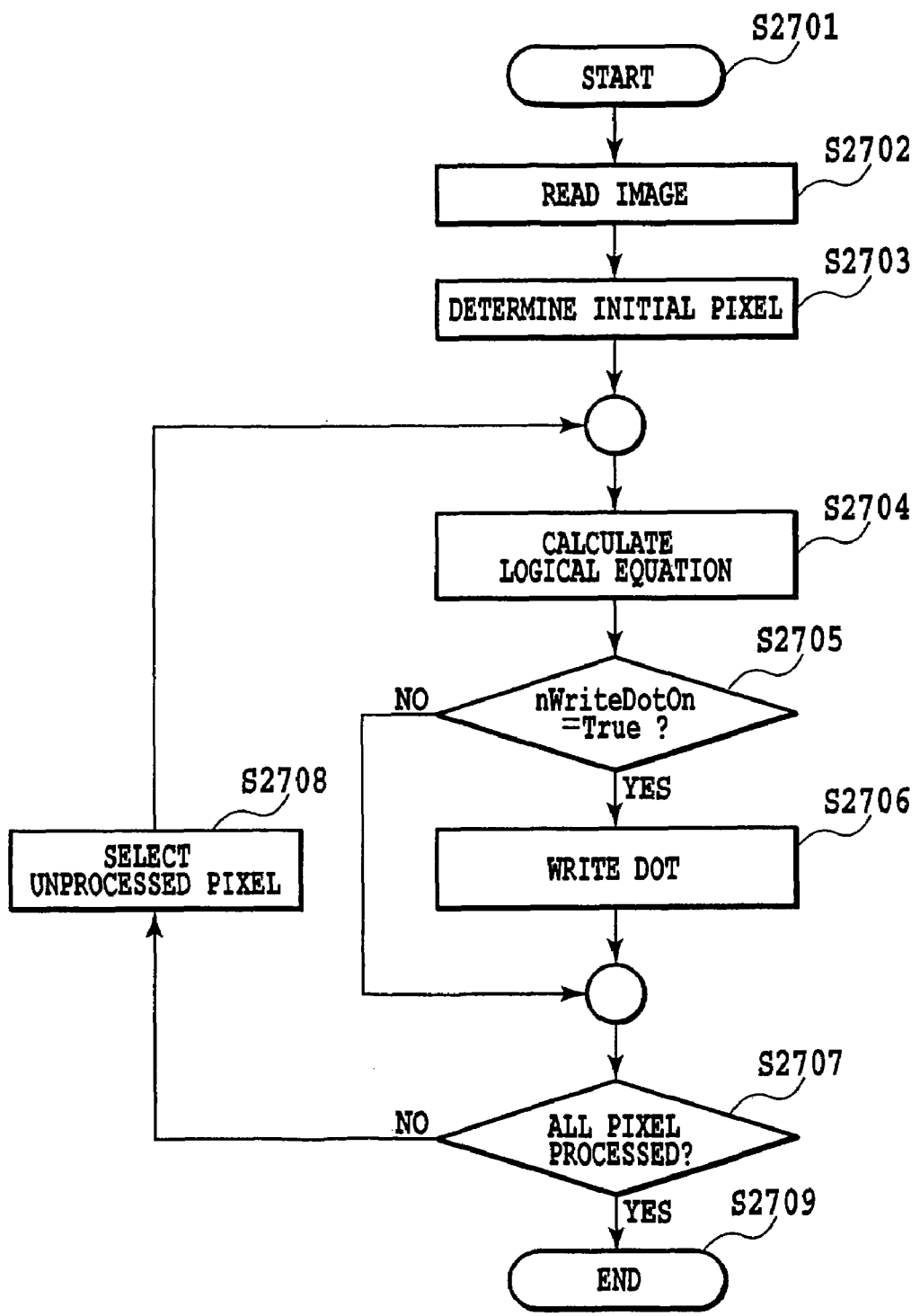
FIG. 11 is a detailed flowchart showing a tint block pattern drawing process for the tint block printing according to the embodiment.

FIG. 11 is a detailed flowchart showing the tint block pattern drawing processing performed at steps S1901 and S1908 in FIG. 9 or 10. The tint block pattern drawing processing will now be described while referring to FIG. 11.

First, at step S2701, the tint block pattern drawing processing is started via a user interface. At step S2702, the CPU 1 obtains various information required to draw a tint block pattern, such as an input background image, a background threshold pattern, a foreground threshold pattern, a foreground and background area designating image and a camouflage area designating image. At step 2703, the CPU 1 determines the initial pixel to be used to generate a tint block pattern. For example, when a tint block image is generated by performing image processing in raster scan order from the top left to the bottom right of the entire input image, the top left pixel is determined to be the initial pixel.

Sequentially, at step 2704, beginning with the initial pixel of the input background image, the CPU 1 arranges, on tiles, the background threshold pattern, the foreground threshold pattern, the foreground and background area designating image and the camouflage image. Then, the CPU 1 calculates the following equation (1) for the pixels of the input background image to be processed. Based on the obtained results, the CPU 1 determines whether pixel values corresponding to dots to be printed should be written to the memory area. The pixel values correspond to color information that is input.

The background threshold pattern and the foreground threshold pattern are pattern data consisting of "1s" and "0s" that correspond to the writing/non-writing of a dot. These pattern data are made by using the respective dither matrixes that are appropriate for preparing a foreground (a latent-image) and a background image.

$$nWriteDotOn = nCamouflage \times \qquad (1)$$
$$(nSmallDotOn \times \neg nHiddenMark + nLargeDotOn \times nHiddenMark)$$

The definitions of the elements of this equation are as follows.

nCamouflage: nCamouflage is 0 if a pixel of interest constitutes the camouflage area of the nCamouflage area designating image; otherwise, nCamouflage is 1.

nSmallDotOn: nSmallDotOn is 1 if a pixel in the background threshold pattern is black; otherwise, nSmallDotOn is 0 (color is not defined by this setting).

nLargeDotOn: nLargeDotOn is 1 if a pixel in the foreground threshold pattern is black; otherwise, nLargeDotOn is 0 (color is not defined by this setting).

nHiddenMark: nHiddenMark is 1 if a pixel of interest in the foreground and background area designating image corresponds to a latent-image, or 0 if the pixel of interest corresponds to a background portion.

¬nHiddenMark: ¬nHiddenmark is the negation of nHiddenMark, and is "0" for the foreground portion or "1" for the background portion.

It is not necessary for all the elements of equation (1) to be calculated for pixels to be processed, and the processing speed can be increased by eliminating unnecessary calculations.

For example, when nHiddenMark=1, ¬nHiddenMark=0, and when nHiddenMark=0, ¬nHiddenMark=1. Therefore, when nHiddenmark=1, the value obtained by equation (2) below can be used as the value of nLargeDotOn, and when nHiddenMark=0, the value obtained by equation (2) can be used as the value of nSmallDotOn.

Furthermore, as represented by equation (1), the value of nCamouflage is a multiplicand, so that when nCamouflage=0, nWriteDotOn=0. Therefore, when nCamouflage=0, the following calculation of equation (2) can be omitted.

$$(nSmallDotOn \times \neg nHiddenMark + nLargeDotOn \times nHiddenMark) \qquad (2)$$

In the generated tint block image, an image having a size of the least common multiple of the vertical lengths and the horizontal lengths of the background threshold pattern, the foreground threshold pattern, the foreground and background area designating image and the camouflage designating image is regarded as a minimum unit for repetition. Therefore, the tint block pattern drawing section generates only the portion of a tint block image that is the minimum unit for repetition, and repetitively arranges this portion on each tile until the size of the image to be generated is reached. In this manner, the time required for generating the tint block image can be reduced.

At step S2705, the CPU 1 determines the calculation results (the value of nWriteDotOn) at step S2704. That is, when nWriteDotOn=1, program control advances to step S2706, or when nWriteDotOn=0, program control is shifted to step S2707.

At step S2706, the CPU 1 designates pixel values corresponding to dots to be printed. The pixel values can be changed in accordance with the color of a tint block image. When a black tint block image is to be created, pixels to be processed for a tint block image are set to black. A color tint block image, such as cyan, magenta or yellow, can also be created in accordance with the toner or ink color used by the printer. In addition, when image data include one to several bits for one pixel, a pixel value can be expressed by using index colors. An index color is an image data expression method. Specifically, color information that frequently appears in a target color image is designated an index (e.g., index 0 is defined as white, index 1 is defined as cyan), and the value of each pixel is used to represent the number of an index indicating color information (e.g., the first pixel value indicates the value of index 1, the second pixel value indicates the value of index 2, . . . ).

At step S2707, the CPU 1 determines whether all the pixels in the target area have been processed. When all the pixels in the target area have not yet been processed, program control advances to step S2708, and the CPU 1 selects a pixel that has not been processed and performs the processes at steps S2704 to S2706 again. When all the pixels in the target area have been processed, program control is shifted to step S2709. The processing is thereafter terminated.

Through the above processing, a tint block image can be prepared.

The tint block pattern is generated through the above described processing. The tint block image generation processing is performed in common for step S1901 in FIG. 9 and step S1908 in FIG. 10; however, the drawing process for the tint block pattern differs from the drawing process for the original data.

At step S1901 in FIG. 9, since the tint block image is the base, the watermark processing is performed. During this processing, after a tint block image has been drawn, characters created by an application are drawn as a watermark, i.e., after the tint block image has been drawn, normal data are printed. That is, no special process is performed to draw a tint block image.

On the other hand, at step S1908 in FIG. 10, since the normal data have been printed and a tint block pattern is to be drawn over the normal data, as the base, the superimposed drawing processing is performed. In this case, a tint block pattern is superimposed and drawn on characters that are created by an application. Therefore, if the tint block pattern is drawn, the base would be overwritten and hidden by the tint block image. Therefore, logical rendering, such as AND or OR, is employed to avoid completely overwriting the normal image with the tint block image. For example, when a pixel in the base is white (i.e., the pixel value is zero), a pixel in the tint block pattern is drawn that corresponds to this pixel.

Licensing Process for Tint Block Printing

The printer driver 203 that includes the tint block printing function, explained while referring to FIGS. 1 to 11, can be a printer driver that incorporates the tint block printing function or a library module that provides the tint block printing function and is added by performing a separate installation. This software product is provided for a user as a trial version, and when after the user has used it the user desires to continue its use, the user is requested to purchase a fare-paying license. An explanation will now be given for the processing performed to encourage a user to purchase the license for the software product (hereinafter this processing is referred to as "tint block printing licensing process"). The tint block print licensing process is one of the processes performed by a printer driver that incorporates the tint block printing function or a library module that provides the tint block printing function and is added by performing a separate installation.

Figure 12:
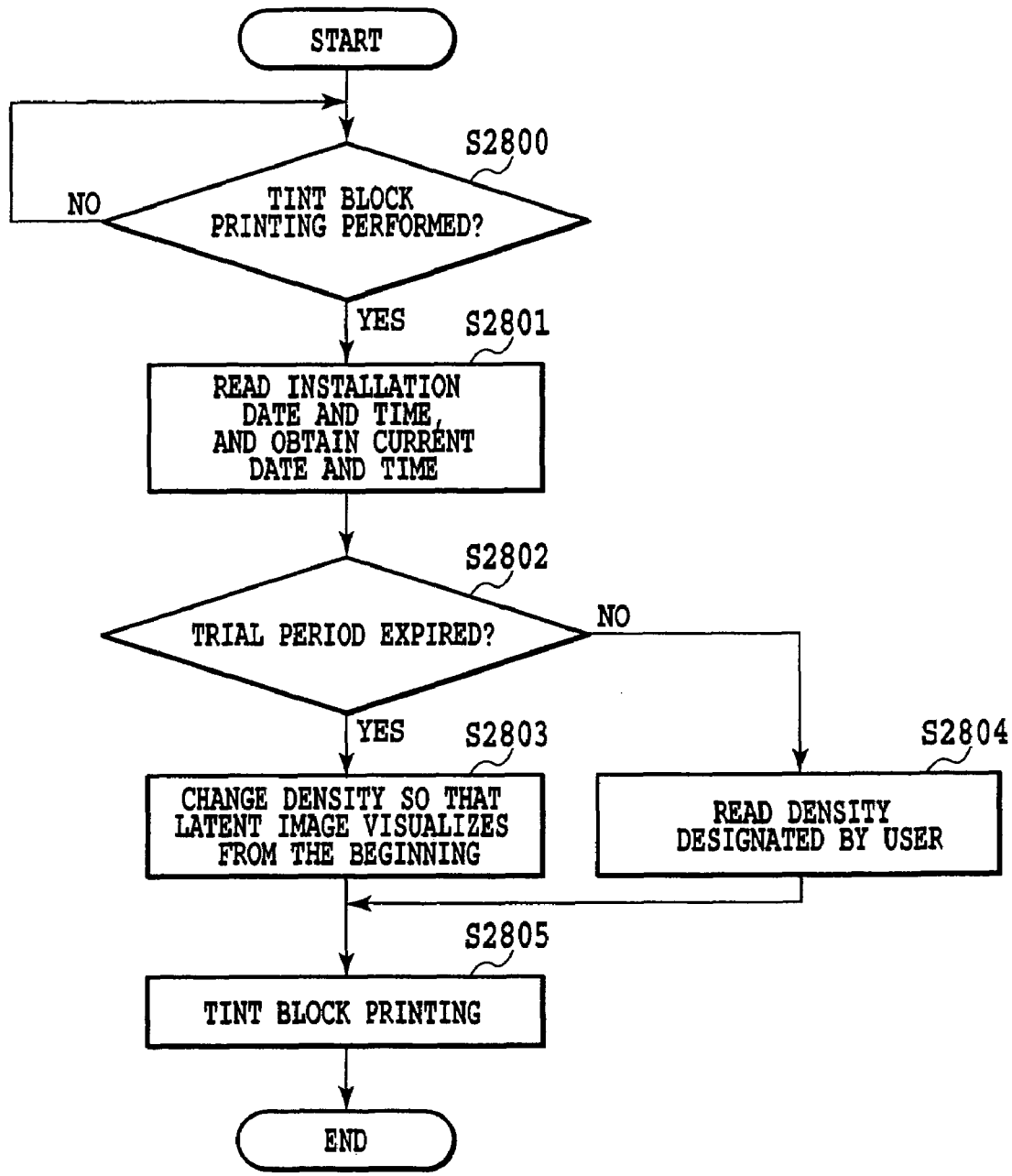
FIG. 12 is a flowchart showing the printing license purchase processing for the tint block printing according to the embodiment.
Figure 13:
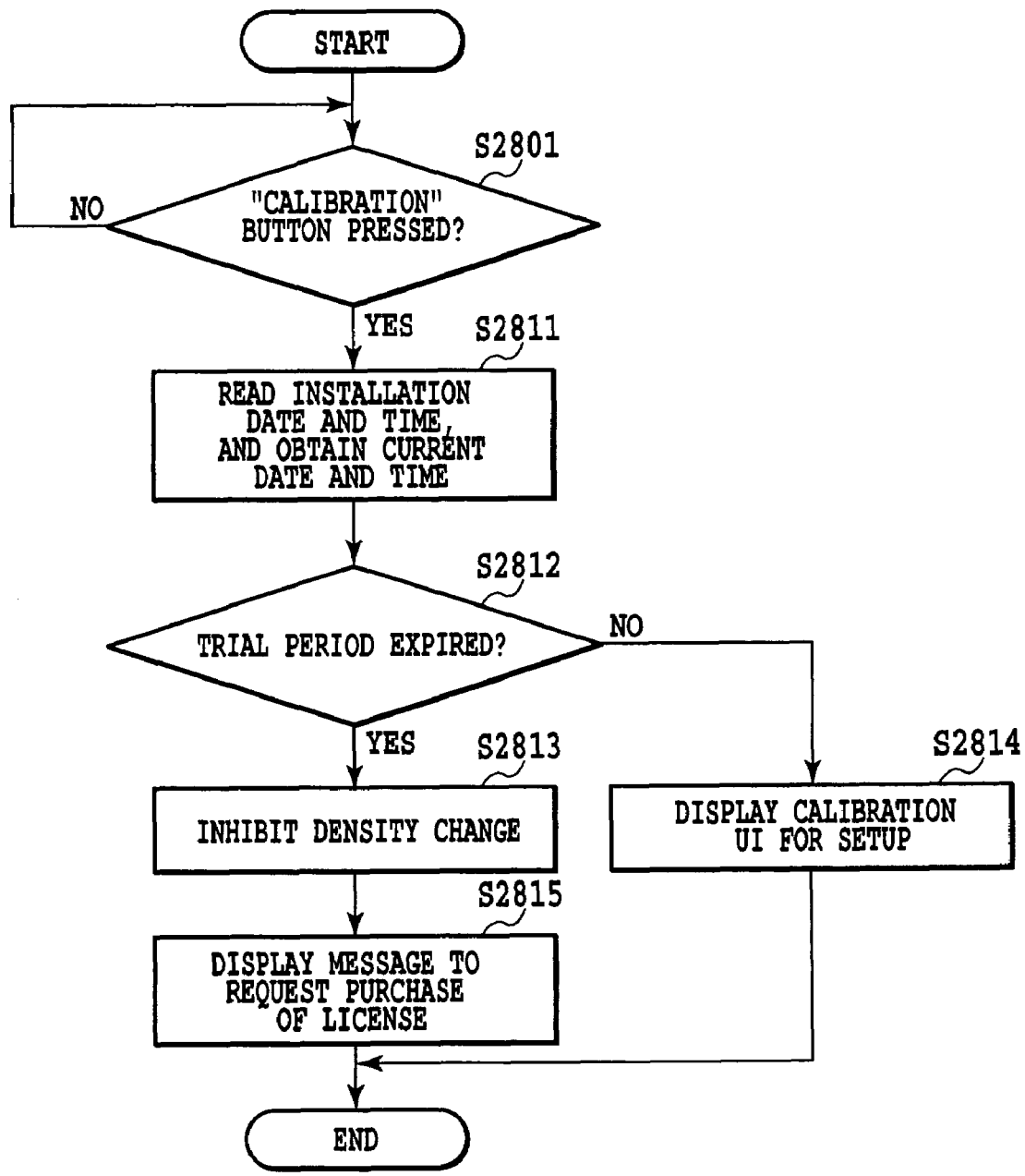
FIG. 13 is a flowchart showing the printing license purchase processing, related to a user interface, for the tint block printing according to the embodiment.

The tint block print licensing process is roughly composed of two portions: a portion (FIG. 12) related to the tint block printing process and a portion (FIG. 13) related to the user interface process for tint block printing. Especially in this embodiment, even when the trial period for a software product (a printer driver incorporating a tint block printing function, or a library module including a tint block printing function) has elapsed, the normal printing function of the software product can be continued to be used. Also, the tint block printing function is inhibited, and the processing shown in FIGS. 12 and 13 is performed.

First, the licensing process for tint block printing in FIG. 12 will be explained.

Assume that tint block printing is selected in the check box 2102 to designate tint block printing.

At step S2800, the CPU 1 detects the execution of the tint block printing function. Specifically, the CPU 1 detects that the tint block processor 205 has performed the initialization process, and determines that tint block printing function is being executed. In this case, program control advances to step S2801. Instead, whether the tint block printing has been selected in the check box 2102 described above may be examined. At step S2801, the CPU 1 reads, from the storage area controlled in the operating system, the date and time at which the printer driver having the tint block printing function or the library module providing the tint block printing function was installed, and obtains the current date and time through the API (Application Program Interface) of the operating system. At step S2802, the CPU 1 compares a difference between the installation date and time and the current date and time with the trial period that has been designated in advance, and determines whether the trial period has expired. When, at step S2802, the CPU 1 determines that the trial period has expired, program control advances to step S2803. When the trial period has not yet elapsed, program control is shifted to step S2804.

At step S2803, the densities of the latent-image portion and the background portion for tint block printing are adjusted to respective previously set densities. This causes the latent-image portion to appear at the same printing density as on a duplicate, when a tint block image is actually printed by a printer next step S2805. More specifically, at step S2804, from the beginning, the latent-image portion and the background portion that are designated by a user are adjusted to the same densities as those when a latent-image appears during duplication. In this manner, a latent-image can not be recognized in tint block printing. More specifically, the density of the background portion that disappears, or is infinitely faded by copying, is set lower than the density designated by the user. Also, the density of the latent-image portion that appears during copying is set higher than the density that is designated by the user. These values for the densities are determined in advance. In this embodiment, the density values for the latent-image portion and the background portion are changed to previously determined values; however, the density value for either the latent-image portion or the background portion may be changed. More preferably, the density for the background portion (an area formed of dots that can not be copied by a copier) is regarded as the density value for normal tint block printing, and the density of the latent-image portion (an area formed of dots that can be copied by a copier) is changed to a density that is higher than the background portion and that a user can identify. In this manner, the image has still a practical value as a tint block image although the printed matter can not be used as material to which a normal tint block image has been added.

At step S2804, the CPU 1 reads the density value the user designated in the calibration explained while referring to FIGS. 5 and 6, or the default density value.

Finally, at step S2805, the CPU 1 performs tint block printing in accordance with the density values designated at step S2803 or S2804.

At step S2801, the installation date and time is employed for the calculation of the trial period. However, instead of the installation date and time, the time at which the software product that was installed actually started to be used can be employed for the calculation of the trial period. That is, the start of the trial period of a software product is a matter that the person who manufactures and sells the software product can designate while taking into account the contents of the software product, and is the same kind of matter as the length of the trial period. Specifically, data, such as the installation date and time or the actual use start time, with which an event is effectively detected can be employed. As described above, in the present invention, the start of the trial period is not limited to a specific point, and a point at which the above described event is effectively detected can be designated as a start point.

As described above, when the trial period of the software product has elapsed without the license for a regular version (a fare-paying version) being purchased, the density adjustment function for the normal tint block printing is halted, and the density for tint block printing is set to the density at which the latent-image portion appears during a printing process. Thus, the user can observe the same image as an image wherein a tint block image is actually copied, from the printing results by the printer 1500. As a result, the user understands, for example, that the character string "COPY" will be superimposed on a normal image using tint block printing, to experience the effects of the tint block printing function. And the user can continuously employ the current software product of the trial version as a printer driver that includes a normal printing function. Further, since the software product of the trial version is set so that only the tint block printing function is inhibited after the trial period has elapsed, a manufacturer causes the continuing use of the trial version to be restrained without the user experiencing any inconvenience in the performance of normal printing. In addition, the user can be encouraged to purchase a fare-paying license, and a sales promotion effect is obtained.

The user interface process related to tint block printing in FIG. 13 will now be described.

First, at step S2810, the CPU 1 detects that the "calibration" button 2106 in FIG. 3 has been selected. At step S2811 and S2812, the CPU 1 employs the same method as at steps S2801 and S2802, explained while referring to FIG. 12, to determine whether the software product of the trial version having the tint block printing function is in the trial period. When the trial period has expired, program control advances to step S2813, or when the trial period has not yet expired, program control is shifted to step S2814.

Figure 14:
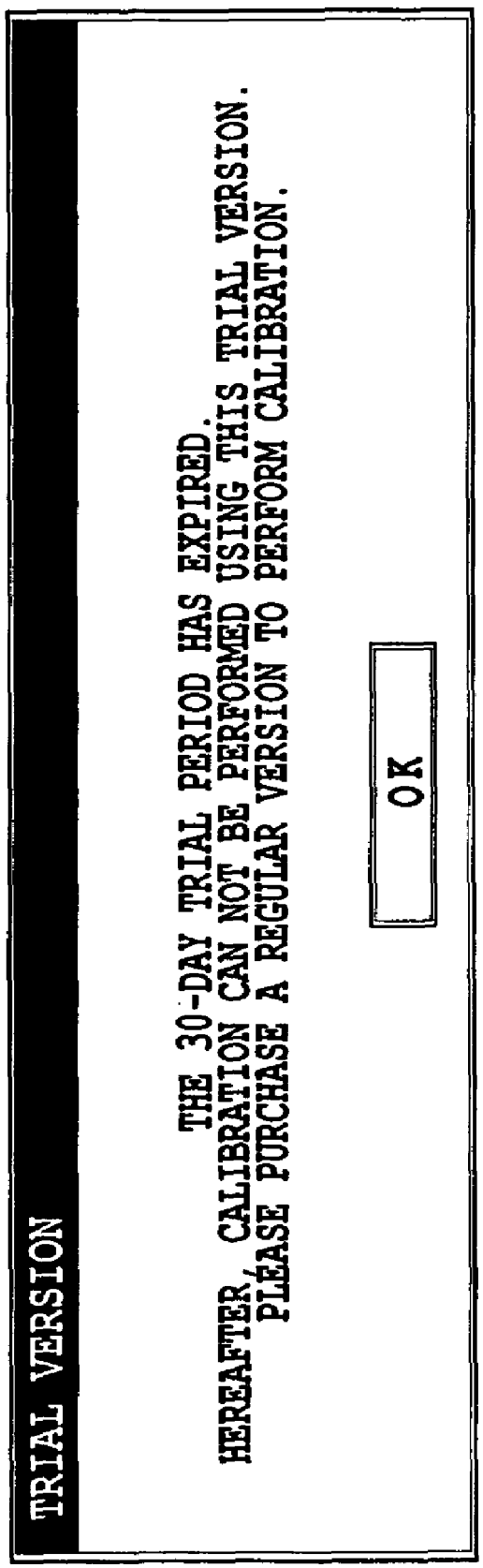
FIG. 14 is a diagram showing a message for determining the license purchase status, which is related to the process in FIG. 13.
Figure 15:
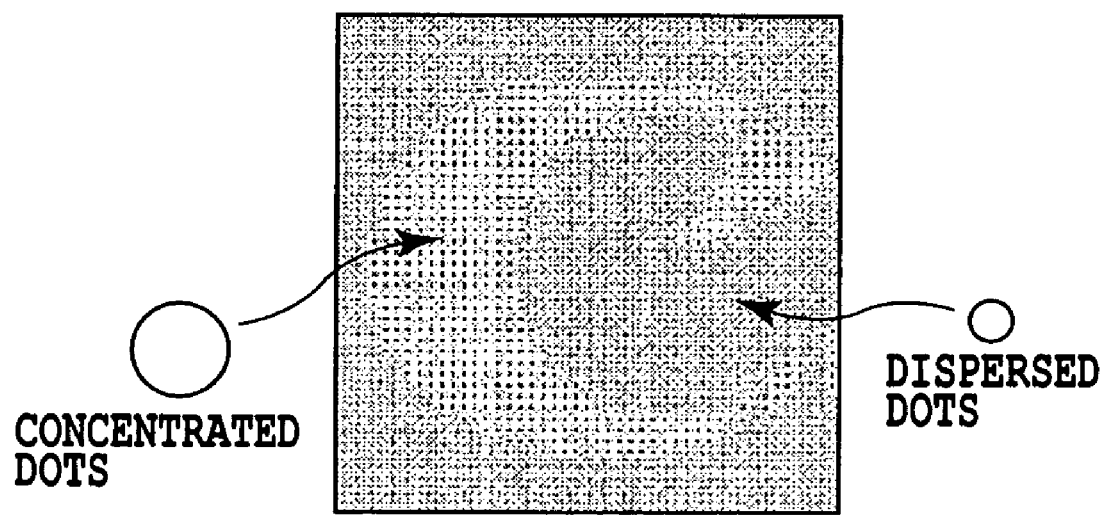
FIG. 15 is a diagram showing the state of dots in a tint block image.
Figure 16A:
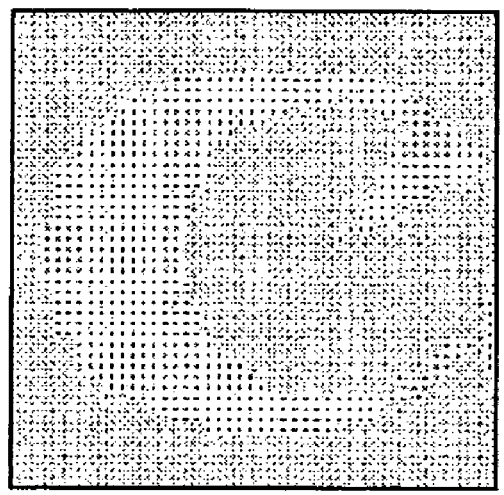
FIGS. 16A and 16B are diagrams showing the state wherein a tint block image is visualized by duplication.
Figure 16B:
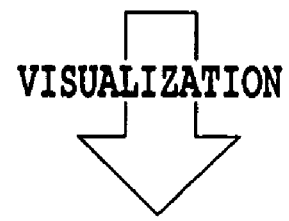
Figure 16B:
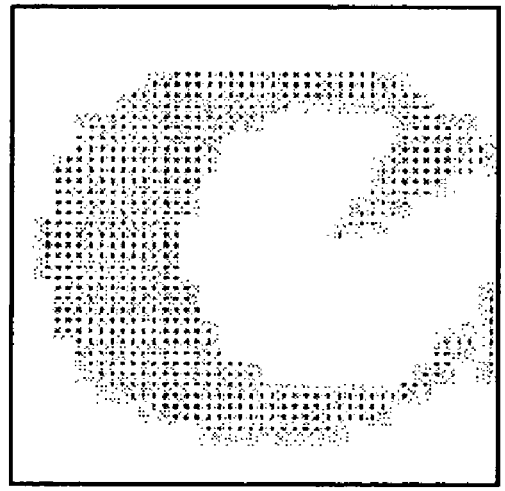

At step S2813, the CPU 1 causes the calibration dialogue displaying process, which is the normally executed process when the "calibration" button 2106 is selected, to be inhibited. More specifically, instead of displaying the calibration dialogue, program control advances to step S2815, a message box in FIG. 14 is displayed to encourage a user to purchase the license. When the CPU 1 determines at step S2812 that the trial period does has yet expired, the CPU 1 performs the normal process for displaying the calibration dialogue. The processing is thereafter terminated.

Because of this processing in FIG. 13, after the trial period has elapsed, the message shown in FIG. 14 is displayed when the user attempts tint block printing and performs calibration in order to first adjust the densities of the latent-image portion and the background portion. That is, because the trial period has expired, a message indicating that the density adjustment process is disabled, and a message requesting the purchase of the license for the software product including a tint block printing function are displayed. In this case, as well as in the process in FIG. 12, the user can continue to use the currently used software product of the trial version as a printer driver that includes the normal printing function. However, there may be a case wherein the user desires to use a printer driver that has a tint block printing function, and therefore purchases the license for another software product that has a tint block printing function.

The processing in FIG. 12 and the processing in FIG. 13 can be independently activated. For example, the tint block printing processing in FIG. 12 can be activated without performing the user interface processing related to the calibration in FIG. 13, i.e., the tint block image density adjustment processing. In this case, a default value is employed for the setup density at step S2804 in FIG. 12. Since the processing related to tint block printing is independently activated, whatever tint block print related processing the user select, it is possible to encourage the user to purchase the license of the software product.

As described above, according to the embodiment, the software product of the trial version having a tint block printing function can be provided that can continue to execute normal printing, and that enables the promotion of the sale of the software products.

The manipulation by the user, described in FIG. 13, to start the process for displaying the message to request the purchase of the license is not limited to the selection of the "calibration" button. For example, when the "style edit" button in FIG. 3 is selected, it may be determined whether the trial period has expired, and when the trial period has expired, a message for requesting that the license be purchased may be displayed. More specifically, when a specific UI related to tint block printing, including the "tint block printing" check box 2102 in FIG. 3, is prepared, the above described display may be presented. In this case, it is preferable that a message indicating the density adjustment not is disabled, but that a message indicating editing of an arbitrary style is disabled or a message indicating that normal tint block printing is disabled be displayed.

The processing in FIGS. 12 and 13 can also be conducted by any of a software product of a trial version that is distributed so as to be purchased as a regular version (continuous use version), or a software product for a trial version that can be continuously used by entering a license key online or offline.

As a condition for limiting the trial of tint block printing, not only "a specific period of time elapsed since the tint block printing function was installed" described above in the embodiment, but also "the tint block printing function was performed a specific number of times" or "a tint block image was printed on a specific number of sheets" can also be used.

When the tint block printing function is performed a predetermined number of times, and in the case of limiting the trial of the following tint block printing function is limited, the CPU 1 counts the number of times the tint block printing function has been employed and stores the count information in the memory. Then, when the count information reaches a predetermined threshold value, and when the tint block printing function is to be employed next, only the processing in FIG. 12 or in FIG. 13 may be performed.

When the tint block image is printed on a specific number of sheets, and in the case of limiting the use of the tint block printing function thereafter, the CPU 1 counts the number of pages printed by using the tint block printing function, and stores the sheet count information in the memory. Then, when the sheet count information reaches a predetermined threshold value, and when the tint block printing function is to be used next, only the processing in FIG. 12 or 13 may be performed.

Before the trial period of the tint block printing elapses, a user is allowed to edit arbitrary style, and after the trial period has elapsed, the style may be forcibly changed to a pre-designated style together with the performance of the processing in FIG. 12. For example, a character string, such as "trial version sample", which cause a user to be aware of hesitating to use the software product as the normal output material, is appropriate. To perform this control process, information related to the style included in the additional printing information in FIG. 8 need only be changed to style information that is incorporated in the software product of the trial version and is used after the trial period of the trial version has elapsed.

Other Embodiments

The object of the present invention is put into practice by executing program codes of software such as those shown in FIGS. 12 and 13, for example, which are supplied to a computer in an apparatus or a system connected to various devices to operate these devices so as to implement the functions of the above described embodiments, so that the various devices are operated in accordance with the programs stored in the computer (CPU or MPU) of the system or apparatus.

In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Application No.2004-278333 filed Sep. 24, 2004, which is hereby incorporated by reference herein.

What is claimed is:

1. A computer-readable storage medium that stores a print control program for causing an information processing apparatus to execute a process for controlling printing by a printing apparatus based on print data including tint block print data created by adding a tint block image having a latent-image and a background image to an image to be printed, wherein said process comprising:

a judgment step of, when printing is performed based on the tint block print data, judging whether elapsed time from a predetermined point of time in using said print control program exceeds a predetermined time period, or judging whether an amount of a tint block print which has printed from beginning of using said print control program exceeds a predetermined amount;

a density adjustment step of, when said judgment step judges that the elapsed time exceeds the predetermined time period or that the amount of the tint block print exceeds the predetermined amount, adjusting a density of at least one of the latent-image and the background image of the tint block image so that the latent-image is visually recognized when the tint block print is performed and, when said judgment step judges that the elapsed time does not exceed the predetermined time period or that the amount of the tint block print does not exceed the predetermined amount, adjusting a density of at least one of the latent-image and the background image of the tint block image so that the latent-image is not visually recognized when the tint block print is performed; and a control step of controlling the printing apparatus to perform printing based on the tint block print data density of which has been adjusted in said density adjustment step.

2. A computer-readable storage medium as claimed in claim 1, wherein said process further comprises a second judgment step of, when a predetermined input related to the tint block print is given in the information processing apparatus, judging whether elapsed time from a predetermined point of time in using said print control program exceeds a predetermined time period, or judging whether an amount of a tint block print which has printed from beginning of using said print control program exceeds a predetermined amount; and a display step of, when said second judgment step judges that the elapsed time exceeds the predetermined time period or that the amount of the tint block print exceeds the predetermined amount, displaying a message to say that a arbitrary density adjustment is unable, in the information processing apparatus.

3. A computer-readable storage medium as claimed in claim 1, wherein, when said judgment step judges that the elapsed time does not exceed the predetermined time period or that the amount of the tint block print does not exceed the predetermined amount, the density of the tint block image adjusted by said density adjustment step is previously set in the information processing apparatus.

4. A computer-readable storage medium as claimed in claim 2, wherein said process further comprising second control step of, when said second judgment step judges that the elapsed time does not exceed the predetermined time period or that the amount of the tint block print does not exceed the predetermined amount, performs a process corresponding to a predetermined input related to the tint block print.

5. A computer-readable storage medium as claimed in claim 1, wherein the predetermined amount is the number of times of performing the tint block print or the number of print pages of the tint block print.

6. A computer-readable storage medium as claimed in claim 4, wherein the predetermined input related to the tint block print is a designation input for causing the information processing apparatus to display a user interface for adjusting the density of the tint block image.

7. A print control method for controlling printing by a printing apparatus based on print data including tint block print data created by adding a tint block image having a latent-image and a background image to an image to be printed, said method comprising:
   a judgment step performed by a judgment means of, when printing is performed based on the tint block print data, judging whether elapsed time from a predetermined point of time in using said print control program exceeds a predetermined time period, or judging whether an amount of a tint block print which has printed from beginning of using said print control program exceeds a predetermined amount;
   a density adjustment step of, when said judgment step judges that the elapsed time exceeds the predetermined time period or that the amount of the tint block print exceeds the predetermined amount, adjusting by an adjusting means a density of at least one of the latent-image and the background image of the tint block image so that the latent-image is visually recognized when the tint block print is performed; and
   a control step of controlling by a control means the printing apparatus to perform printing based on the tint block print data density of which has been adjusted in said density adjustment step.

8. A print control method as claimed in claim 7, further comprising:
   second judgment step of, when a predetermined input related to the tint block print is given in the information processing apparatus, judging whether elapsed time from a predetermined point of time in using said print control program exceeds a predetermined time period, or judging whether an amount of a tint block print which has printed from beginning of using said print control program exceeds a predetermined amount; and
   display step of, when said second judgment step judges that the elapsed time exceeds the predetermined time period or that the amount of the tint block print exceeds the predetermined amount, displaying a message to say that a arbitrary density adjustment is unable, in the information processing apparatus.

9. A print control method as claimed in claim 7, wherein, when said judgment step judges that the elapsed time does not exceed the predetermined time period or that the amount of the tint block print does not exceed the predetermined amount, the density of the tint block image adjusted by said density adjustment step is previously set in the information processing apparatus.

10. A print control method as claimed in claim 8, further comprising second control step of, when said second judgment step judges that the elapsed time does not exceed the predetermined time period or that the amount of the tint block print does not exceed the predetermined amount, performs a process corresponding to a predetermined input related to the tint block print.

11. A print control method as claimed in claim 7, wherein the predetermined amount is the number of times of performing the tint block print or the number of print pages of the tint block print.

12. A print control method as claimed in claim 10, wherein the predetermined input related to the tint block print is a designation input for causing the information processing apparatus to display a user interface for adjusting the density of the tint block image.

13. An information processing apparatus for controlling printing by a printing apparatus based on print data including tint block print data created by adding a tint block image having a latent-image and a background image to an image to be printed, said apparatus comprising:
   judgment means for, when printing is performed based on the tint block print data, judging whether elapsed time from a predetermined point of time in using said print control program exceeds a predetermined time period, or judging whether an amount of a tint block print which has printed from beginning of using said print control program exceeds a predetermined amount;
   density adjustment means for, when said judgment means judges that the elapsed time exceeds the predetermined time period or that the amount of the tint block print exceeds the predetermined amount, adjusting a density of at least one of the latent-image and the background image of the tint block image so that the latent-image is visually recognized when the tint block print is performed and, when said judgment means judges that the elapsed time does not exceed the predetermined time period or that the amount of the tint block print does not exceed the predetermined amount, adjusting a density of at least one of the latent-image and the background image of the tint block image so that the latent-image is not visually recognized when the tint block print is performed; and
   control means for controlling the printing apparatus to perform printing based on the tint block print data density of which has been adjusted in said density adjustment step.

14. An information processing apparatus as claimed in claim 13, further comprising:
   second judgment means for, when a predetermined input related to the tint block print is given in said information processing apparatus, judging whether elapsed time from a predetermined point of time in using said print control program exceeds a predetermined time period, or judging whether an amount of a tint block print which has printed from beginning of using said print control program exceeds a predetermined amount; and
   display means for, when said second judgment means judges that the elapsed time exceeds the predetermined time period or that the amount of the tint block print exceeds the predetermined amount, displaying a message to say that a arbitrary density adjustment is unable, in said information processing apparatus.

15. A print control method for causing an information processing apparatus to execute a process for creating a tint block image having a latent-image and a background image, the tint block image being added to an image to be printed, said method comprising the steps of:
   holding by a holding means at least one of the latent-image and the background image of the tint block image, in relation to information on a first density by which normal tint block print is performed;
   changing by a changing means the first density into a second density higher than the first density after a creating process of the tint block image is executed for a predetermined time period, or after the creating process of the tint block image is executed for a predetermined number of times, or after the creating process of the tint block image is executed for a predetermined number of pages; and
   inhibiting by an inhibiting means the process of changing a density into a density excluding the second density after a density is changed into the second density from executed.

16. A print control method as claimed in claim 15, further comprising the step of giving a message to say that execution of the process of hanging a density is unable, with inhibiting the process of changing a density into a density excluding the second density.

* * * * *